US005269962A

United States Patent [19]

Brodbeck et al.

[11] Patent Number: 5,269,962

[45] Date of Patent: * Dec. 14, 1993

[54] OXIDANT COMPOSITION CONTAINING STABLE BLEACH ACTIVATOR GRANULES

[75] Inventors: Kevin J. Brodbeck, Pleasanton; Thomas B. Ottoboni, Belmont; Cris T. Spillett, Walnut Creek, all of Calif.; Dale S. Steichen, Danbury, Conn.; Suzanne M. Thompson, Oakland, Calif.; Alfred G. Zielske, Pleasanton, Calif.; Steven A. Bolkan, Pleasanton, Calif.

[73] Assignee: The Clorox Company, Oakland, Calif.

[ * ] Notice: The portion of the term of this patent subsequent to Oct. 18, 2005 has been disclaimed.

[21] Appl. No.: 674,844

[22] Filed: Mar. 25, 1991

Related U.S. Application Data

[63] Continuation-in-part of Ser. No. 258,225, Oct. 14, 1988, Pat. No. 5,002,691.

[51] Int. Cl.[5] .......... C01B 15/00; C09K 3/00

[52] U.S. Cl. .......... 252/186.25; 252/186.27; 252/186.38; 252/186.39; 252/99; 252/102

[58] Field of Search .......... 252/186.25, 186.27, 252/186.3, 186.31, 186.38, 186.39, 99, 102

[56] References Cited

U.S. PATENT DOCUMENTS

| | | | |
|---|---|---|---|
| 3,661,789 | 5/1972 | Corey et al. | 252/186 |
| 3,671,439 | 1/1972 | Corey et al. | 252/99 |
| 3,726,967 | 4/1973 | Vorsatz et al. | 424/62 |
| 3,769,224 | 10/1973 | Inamorato | 252/99 |
| 3,779,931 | 12/1973 | Fries et al. | 252/99 |
| 3,789,002 | 1/1974 | Weber et al. | 252/99 |
| 3,833,506 | 9/1974 | Fries et al. | 252/99 |
| 3,960,743 | 6/1976 | Nakagawa et al. | 252/99 |
| 3,982,892 | 9/1976 | Gray et al. | 8/111 |
| 4,009,113 | 2/1977 | Green et al. | 252/95 |
| 4,059,538 | 11/1977 | Green et al. | 252/95 |
| 4,087,369 | 5/1978 | Wevers | 252/102 |
| 4,111,826 | 9/1978 | Leigh et al. | 251/89 R |

(List continued on next page.)

FOREIGN PATENT DOCUMENTS

| | | |
|---|---|---|
| 051987 | 5/1982 | European Pat. Off. . |
| 1106634 | 4/1984 | European Pat. Off. . |

(List continued on next page.)

OTHER PUBLICATIONS

European Search Report from EP 92.302416.0 (equivalent hereof).

Database printout for Amini et al., U.S. 5,153,341, Issued Oct. 6, 1992, for "Preparation of Alkanoyloxyacetyloxybenzenesulfonate Salts via New Acids . . ."

Database printout for Amini et al., W.O. 92.16492, published Oct. 1, 1992, for "Process for Preparation of Phenyl Esters of Alkanoyloxyacetic Acids . . ."

European Search Report to European Application No. 89.306303 (EP 373,743).

*Primary Examiner*—Richard D. Lovering

*Assistant Examiner*—Joseph D. Anthony

*Attorney, Agent, or Firm*—Joel J. Hayashida; Michael J. Mazza; Harry A. Pacini

[57] ABSTRACT

The present invention provides stable bleach activator granules comprising:

(a) a peroxygen bleach activator having the structure:

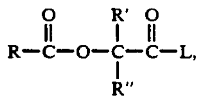

wherein R is $C_{1-20}$ branched or straight chain alkyl, alkoxylated alkyl, cycloalkyl, alkenyl, aryl, substituted aryl, alkylaryl; R' and R" are independently H, $C_{1-4}$ alkyl, aryl; and L is a leaving group;

b) a pliable binding material selected from materials having a melting completion temperature of greater than about 40° C.; and c) a solubilizing aid selected from the group consisting of magnesium sulfate, alkali aryl sulfonate, polyvinyl pyrrolidone or mixtures thereof.

The invention can also include additional stiffeners, such as calcium or magnesium silicate, or silica.

28 Claims, 1 Drawing Sheet

U.S. PATENT DOCUMENTS

| | | | |
|---|---|---|---|
| 4,145,183 | 3/1979 | Bostwick | 8/111 |
| 4,221,675 | 9/1980 | Schirmann et al. | 252/186 |
| 4,283,302 | 8/1981 | Foret et al. | 252/102 |
| 4,290,903 | 9/1981 | MacGilp et al. | 252/91 |
| 4,321,157 | 3/1982 | Harris et al. | 252/174.25 |
| 4,325,828 | 4/1982 | Postlethwaite | 252/102 |
| 4,333,844 | 6/1982 | Duggleby et al. | 252/97 |
| 4,372,868 | 2/1983 | Saran | 252/102 |
| 4,399,049 | 8/1983 | Gray et al. | 252/91 |
| 4,412,934 | 11/1983 | Chung et al. | 252/186.38 |
| 4,422,950 | 12/1983 | Kemper | 252/186.38 |
| 4,444,674 | 2/1984 | Gray | 252/95 |
| 4,450,089 | 5/1984 | Broze et al. | 252/95 |
| 4,457,858 | 7/1984 | Saran et al. | 252/182 |
| 4,483,778 | 11/1984 | Thompson et al. | 252/94 |
| 4,486,327 | 12/1984 | Murphy et al. | 252/94 |
| 4,490,271 | 12/1984 | Spadini et al. | 252/174.23 |
| 4,536,314 | 8/1985 | Hardy et al. | 252/102 |
| 4,539,130 | 9/1985 | Thompson et al. | 252/94 |
| 4,539,131 | 9/1985 | Garner-Gray | 252/99 |
| 4,568,476 | 2/1986 | Kielman et al. | 252/95 |
| 4,578,206 | 3/1986 | Walker | 252/95 |
| 4,591,450 | 5/1986 | Nistri et al. | 252/135 |
| 4,634,551 | 1/1987 | Burns et al. | 252/102 |
| 4,637,894 | 1/1987 | Smidrkal et al. | 252/186.4 |
| 4,639,326 | 1/1987 | Czempik et al. | 252/91 |
| 4,642,197 | 2/1987 | Kruse et al. | 252/98 |
| 4,671,891 | 6/1987 | Hartman | 252/186.42 |
| 4,678,594 | 7/1987 | Parfomak et al. | 252/186.31 |
| 4,681,592 | 7/1987 | Hardy et al. | 8/111 |
| 4,681,695 | 7/1987 | Divo | 252/94 |
| 4,695,397 | 9/1987 | Sommer et al. | 252/182 |
| 4,695,412 | 9/1987 | Balzer et al. | 260/507 R |
| 4,711,748 | 12/1987 | Irwin et al. | 264/117 |
| 4,713,079 | 12/1987 | Chun et al. | 8/101 |
| 4,726,908 | 2/1988 | Kruse et al. | 252/91 |
| 4,731,196 | 3/1988 | Staton et al. | 252/184 |
| 4,762,636 | 8/1988 | Balliello et al. | 252/95 |
| 4,770,666 | 9/1988 | Clauss | 8/111 |
| 4,772,290 | 9/1988 | Mitchell et al. | 8/107 |
| 4,853,143 | 8/1989 | Hardy et al. | 252/102 |
| 4,921,631 | 5/1990 | Gradwell et al. | 252/186.38 |
| 4,985,180 | 1/1991 | Bellis et al. | 260/404 |
| 5,002,691 | 3/1991 | Bolkan et al. | 252/186.25 |
| 5,091,560 | 2/1992 | Rowland | 560/185 |
| 5,124,475 | 6/1992 | Nepras et al. | 554/90 |
| 5,153,341 | 10/1992 | Dumas et al. | 554/98 |
| 5,182,045 | 1/1993 | Rowland et al. | 252/186 |

FOREIGN PATENT DOCUMENTS

| | | |
|---|---|---|
| 137669 | 4/1985 | European Pat. Off. . |
| 163225 | 12/1985 | European Pat. Off. . |
| 238341 | 9/1987 | European Pat. Off. . |
| 240057 | 10/1987 | European Pat. Off. . |
| 241962 | 10/1987 | European Pat. Off. . |
| 267047 | 5/1988 | European Pat. Off. . |
| 283252 | 9/1988 | European Pat. Off. . |
| 352135 | 1/1990 | European Pat. Off. . |
| 373743 | 6/1990 | European Pat. Off. . |
| 390393 | 10/1990 | European Pat. Off. . |
| 402048 | 12/1990 | European Pat. Off. . |
| 415472 | 3/1991 | European Pat. Off. . |
| 2420647 | 11/1975 | Fed. Rep. of Germany . |
| 3417820 | 11/1985 | Fed. Rep. of Germany . |
| 92/16491 | 10/1992 | PCT Int'l Appl. . |
| 92/16492 | 10/1992 | PCT Int'l Appl. . |
| 1147871 | 4/1969 | United Kingdom . |
| 864798 | 4/1984 | United Kingdom . |
| 2175621 | 12/1986 | United Kingdom . |
| 2178075 | 2/1987 | United Kingdom . |

OXIDANT COMPOSITION CONTAINING STABLE BLEACH ACTIVATOR GRANULES

REFERENCE TO RELATED APPLICATIONS

This is a continuation-in-part of U.S. patent application Ser. No. 07/258,225, filed Oct. 14, 1988, now U.S. Pat. No. 5,002,691 by inventors Steven A. Bolkan et al., also entitled "OXIDANT DETERGENT CONTAINING STABLE BLEACH ACTIVATOR GRANULES," the disclosure of which is incorporated herein by reference thereto.

BACKGROUND OF THE INVENTION

1. Field of the Invention

This invention relates to stable bleach activator granules, specifically, granules which contain activators with the structure:

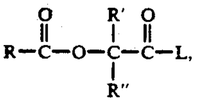

wherein R is $C_{1-20}$ branched or straight chain alkyl, alkoxylated alkyl, cycloalkyl, substituted aryl, alkenyl, aryl, alkylaryl; R' and R'' are independently H, $C_{1-4}$ alkyl, aryl; and L is a leaving group.

These activator granules are combined with either a peroxygen bleach base or a detergent base, which preferably includes a source of peroxide, and, optionally, surfactants, builders and other detergent adjuncts.

In a preferred embodiment, various granule additives are used to improve the solubility, durability, appearance and other important characteristics of the granules.

2. Brief Description of the Prior Art

Bleach activators have been widely described in the literature. For example, Boldingh et al., U.K. 1,147,871, describes bleaching and detergent compositions containing an inorganic persalt and acyloxyalkyl or acyl benzene sulfonates. It is claimed that such esters provide improved bleaching temperatures below 70° C. when compared to compositions using the persalt alone.

These activators are represented by the formula:

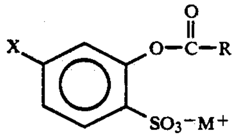

wherein X=branched or straight chain alkyl or acyl radical containing 6–7 carbon atoms; R=H or alkyl radical having 1–7 carbon atoms; and M=an alkali metal, or ammonium radical.

Chung et al., U.S. Pat. No. 4,412,934, discloses bleaching compositions containing a peroxygen bleaching compound and a bleach activator of the general formula

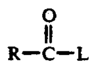

wherein R is an alkyl group containing from about 5 to about 18 carbon atoms; L is a leaving group, the conjugate acid of which has a $pK_a$ in the range of about 6 to about 13. Chung et al. focuses on alkanoyloxy benzene sulfonates, which have been previously disclosed in G.B. 864,798, Hampson et al.

Thompson et al, U.S. Pat. No. 4,483,778, discloses bleach activators of the structure

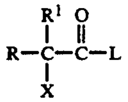

wherein R is $C_{4-14}$ alkyl, $R^1$ is H or $C_{1-3}$ alkyl, X is —Cl, —$OCH_3$, or —$OCH_2CH_3$, and L is a leaVing group whose conjugate acid has a $pK_a$ of 4–30. The apparently crowded alpha carbon in the Thompson et al. compound may present hindered perhydrolytic reactivity.

Hardy et al., U.S. Pat. No. 4,681,952, discloses the use of a bleach activator compound of the formula $[RX]_mAL$, wherein R is hydrocarbyl, $C_{6-20}$ alkyl substituted aryl, or alkoxylated hydrocarbyl; X is O, $SO_2$, $N(R^1)_2$, $(R^1)P \rightarrow O$ or $(R^1)N \rightarrow O$, wherein for m=1, A includes

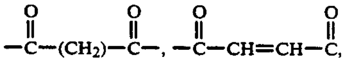

or

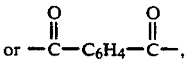

oxybenzene sulfonate.

Burns et al., U.S. Pat. No. 4,634,551, discloses the use of amide esters of the formula

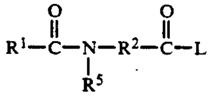

or

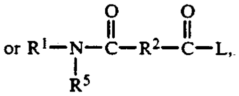

wherein $R^1$ and $R^2$ are alkyl(ene) aryl(ene) or alkylaryl(ene) with 1–4 carbon atoms and $R^5$ is H, an alkyl, aryl, or alkylaryl group with 1–10 carbon atoms.

Nakagawa et al., U.S. Pat. No. 3,960,743, disclose polymeric activators having the general structure

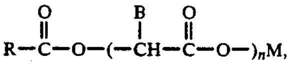

in which R is purported to be $C_{1-16}$ carbon atoms, a halo- or hydroxyl-substituted $C_{1-16}$ alkyl or a substituted aryl group, B is hydrogen or a $C_{1-3}$ alkyl group, M is hydrogen, $C_{1-4}$ alkyl or alkali metal, wherein n is an integer of at least one when M is an alkyl group or n is an integer of least two when M is hydrogen or alkali metal. The polymeric activators of Nakagawa et al., however, suffer from a fatal defect. They do not disclose, teach or suggest perhydrolysis leavino orouos.

Schirmann et al., U.S. Pat. No. 4,221,675, substituted acyloxy N-acetamides of the structure

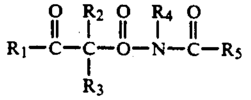

The activators of the present invention do not contain a nitrogen heteroatom as does the activator of Schirmann et al. Moreover, in Schirmann et al., the group in question, an amide, does not bind to the acyl portion of the compound via an oxygen bond. Schirmann et al. do not teach or suggest what peracid is generated or where perhydrolysis occurs. Applicants have demonstrated that the alpha acyloxy, N-acetylacetamide compounds disclosed in Schirmann et al. provide minimal perhydrolysis at site of the amide bond, if at all, and thus do not effectively generate the desired peracid, peralkanoyloxyacetic acid. Thus, Schirmann et al. also do not have an effective leaving group.

Various references have taught how to formulate bleach activator granules using activators of the prior art. For example, Corey et al., U.S. Pat. No. 3,661,789, Green et al., U.S. Pat. No. 4,009,113, Wevers, U.S. Pat. No. 4,087,369, Saran, U.S. Pat. No. 4,372,868, Gray et al., U.S. Pat. No. 4,399,049, Gray, U.S. Pat. No. 4,444,674, Thompson et al., U.S. Pat. No. 4,483,778, Murphy et al., U.S. Pat. No. 4,486,327, Thompson et al., U.S. Pat. No. 4,539,130, Chung et al., E.P. 106,634, Parfomak, U.K. 2,178,075 and Divo, U.S. Pat. No. 4,681,695, all discuss ways of combining a peroxygen bleach activator with some binding or enrobing material.

Fong et al., U.S. Pat. No. 4,778,816 and U.S. Pat. No. 4,959,187, disclose and claim peracid precursors or bleach activators having the structure:

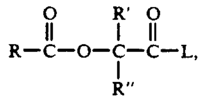

wherein R is $C_{1-20}$ branched or straight chain alkyl, alkoxylated alkyl, cycloalkyl, alkenyl, aryl, substituted aryl, alkylaryl; R′ and R″ are independently H, $C_{1-4}$ alkyl, aryl; and L is a leaving group.

It is further noted that the Fong et al. patents are the parents of application Ser. No. 07/258,225, which in turn is the parent of the present application. The entire text of Fong et al. is incorporated herein by reference. None of the art discloses, teaches or suggests that activators of the above structure can be incorporated in stabilized granules which contain, as a solubilizing aid, either magnesium sulfate, polyvinyl pyrrolidone, alkali aryl sulfonate, or a combination thereof.

Moveover, the art further does not disclose, teach or suggest the use of stiffeners, such as calcium silicate, magnesium silcate, or silica, in compositions of the type herein described.

SUMMARY OF THE INVENTION AND OBJECTS

The invention provides, in one embodiment, stable bleach activator granules comprising:

a) a peroxygen bleach activator having the structure:

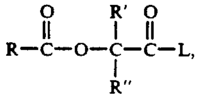

wherein R is $C_{1-20}$ branched or straight chain alkyl, alkoxylated alkyl, cycloalkyl, alkenyl, aryl, substituted aryl, alkylaryl; R′ and R″ are independently H, $C_{1-4}$ alkyl, aryl; and L is a leaving group;

b) a pliable binding material selected from materials having a melting completion temperature of greater than about 40° C.; and c) a solubilizing aid selected from the group consisting of magnesium sulfate, alkali aryl sulfonate, polyvinyl pyrrolidone or mixtures thereof.

In another embodiment, the invention provides stable bleach activator granules as described hereinabove, with additional stiffeners, such as calcium or magnesium silicate, or silica.

In still another embodiment, the invention provides an activated oxidant bleach or detergent comprising (a) the bleach activator granules as described hereinabove, combined with:

(b) a detergent base which comprises:

i) builders;

ii) fillers;

iii) optionally, a surfactant selected from the group consisting of anionic, nonionic, cationic, amphoteric, zwitterionic surfactants, and mixtures thereof; and c) a bleach-effective amount of a source of hydrogen peroxide, which acts in combination with the activator granules of a).

It is therefore an object of this invention to provide improved stable bleaching activator granules as hereinbefore described.

It is another object of this invention to provide bleaching activator granules as hereinbefore described having improved durability, solubility and processibility.

It is yet another object of this invention to provide bleach activator granules which have as a majority of their content, the bleach activator compound.

It is a further object of this invention to provide an oxidant bleach or detergent composition which includes the stable bleach activator granules.

DETAILED DESCRIPTION OF THE PREFERRED EMBODIMENTS

Figure 1:
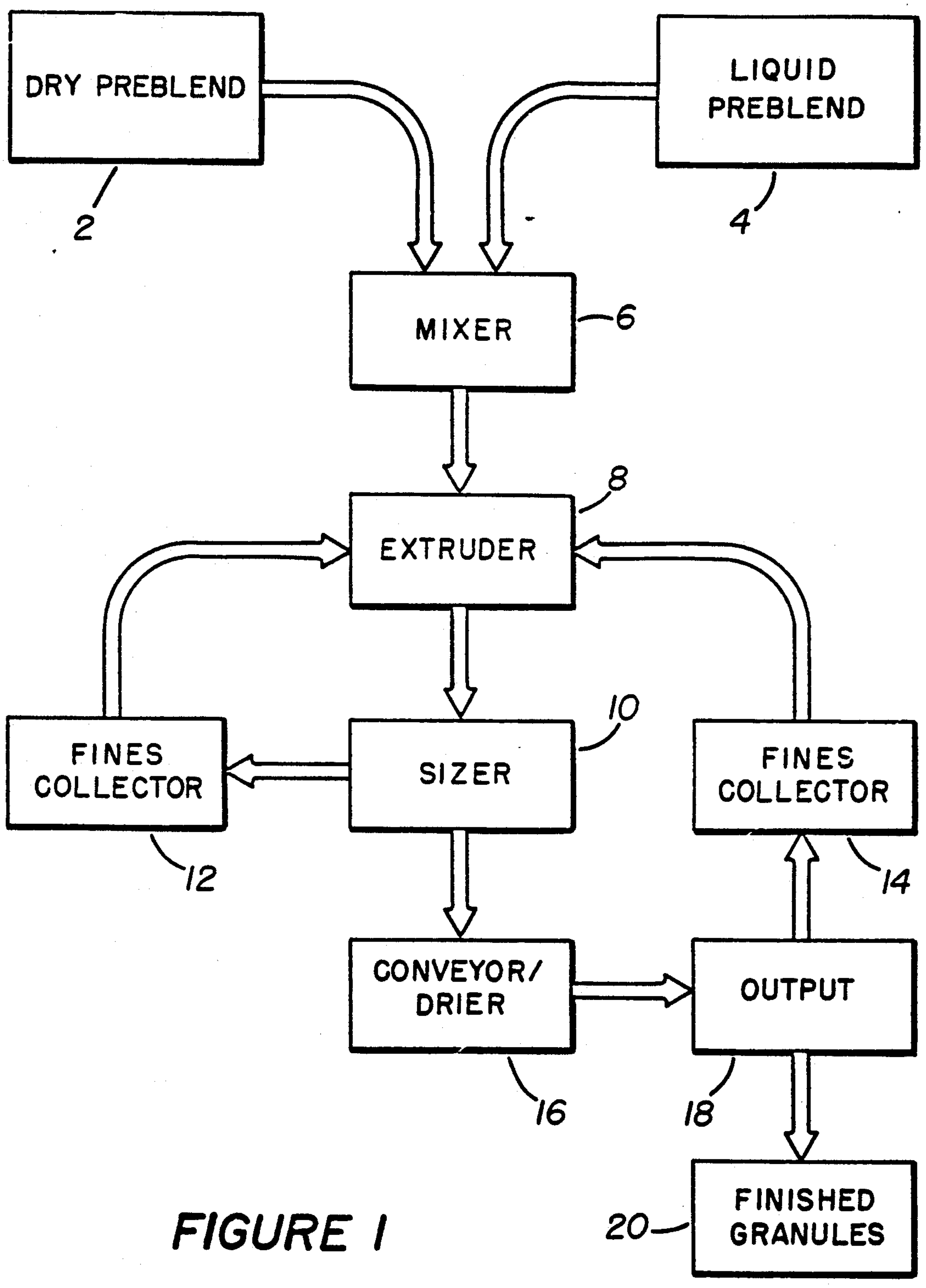
FIG. 1 shows a flow chart describing the manufacture of the bleach activator granules.

The present invention provides stable bleach activator granules comprising:

a) a peroxygen bleach activator having the structure:

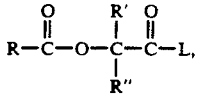

wherein R is $C_{1-20}$ branched or straight chain alkyl, alkoxylated alkyl, , cycloalkyl, alkenyl, aryl, substituted aryl, alkylaryl; R′ and R″ are independently H, $C_{1-4}$ alkyl, aryl; and L is a leaving group;

b) a pliable binding material selected from materials having a melting completion temperature of greater than about 40° C.; and, c) a solubilizing aid selected from the group consisting of magnesium sulfate, alkali aryl sulfonate, polyvinyl pyrrolidone or mixtures thereof.

Preferably, stiffeners, such as calcium and magnesium silcate, or silica, are included in the stable bleach activator granules.

U.S. Pat. No. 4,778,618 and U.S. Pat. No. 4,959,187 disclosed and claimed the activators which the Applicants process into the present inventive granules. The advantages of said activators are amply discussed in the specification of said patent. While Applicants discuss some of the advantages of said activators in this application, for the sake of brevity, Applicants have incorporated U.S. Pat. No. 4,778,618 by reference thereto as if fully set forth herein, and will rely on its discussion therein. The parent of the instant application, U.S. Ser. No. 07/258,225. Additionally of interest is the related application of Richard R. Rowland, Ser. No. 07/635,409, filed Dec. 20, 1990, now U.S. Pat. No. 5,091,560 a continuation of Ser. No. 07/409,279, filed Sep. 8, 1989 and now abandoned, itself a continuation of Ser. No. 07/167,544, filed Mar. 4, 1988 and now abandoned, entitled "METHOD FOR SYNTHESIZING ACYLOXYCARBOXYLIC ACIDS," which discloses methods of acylating the hydroxycarboxylic acids which can be predecessors to the activators of this invention. Said application is incorporated herein by reference.

These types of activators are referred to as alkanoylglyycolate or alkanoyloxyacetic acid esters, since their base carbonyl group is

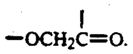

More preferably, the phenyl sulfonate esters of alkanoyloxyacetic acid are found to present distinct advantages over other bleach activators, for instance, in reactivity, solubility and relative ease of manufacture.

Of particular interest from U.S. Pat. No. 4,778,618 is a particularly preferred activator, namely,

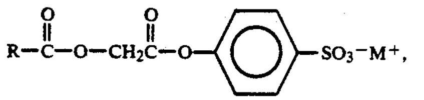

where R is preferably $C_5$-$C_{12}$ alkyl, and M is an alkali metal cation.

Subsequent to the filing of the application which resulted in U.S. Pat. No. 4,778,618, it was discovered that additional desirable sulfonated precursors, which are generally named polyglycolate esters, could be coproduced along with the above precursors, which are called alkanoyloxyglycoylphenyl sulfonates (also known as alkanoyloxyacetyloxyphenyl sulfonates). This is because the parent carboxylic acid which forms the

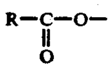

moiety frequently contains some generally low amounts of oligomers, in which the oxyacetyl group is repeated. Thus, in co-pending application Ser. No. 07/329,982, filed Mar. 29, 1989, now U.S. Pat. No. 5,182,045 entitled "Polyglycolate Peracid Precursors," of Richard R. Rowland et al., of common assignment herewith and incorporated by reference thereto, a preferred precursor is claimed, having the structure shown below:

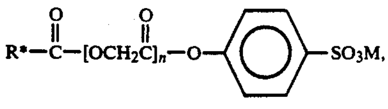

wherein R* is preferably $C_{1-20}$ alkyl, M is preferably H or an alkali metal counterion, and n is $>1$, preferably 2–10. These particular precursors are also advantageously produced by sulfonating the appropriate intermediate and neutralizing the sulfonated intermediate thereafter to provide peracid precursors, as prescribed in a preferred method.

This preferred method of synthesis of these type of preferred compounds is disclosed in co-pending application Ser. No. 07/648,838, filed concurrently herewith, entitled "METHOD FOR SULFONATING ACYLOXYBENZENES AND NEUTRALIZATION OF RESULTING PRODUCT," inventors Ottoboni et al., and of common assignment herewith, said application being incorporated herein by reference thereto.

These types of activators provide numerous benefits over the prior art type activators. The Nakagawa et al. type polymeric activators do not teach, disclose or suggest a leaving group and if their monomer is used as an activator, little or no perhydrolysis occurs. The Schirmann et al. type activators similarly have little or no perhydrolysis.

In the following discussion, certain definitions are utilized:

Peracid precursor is equivalent to bleach activator. Both terms generally relate herein to reactive esters which have a leaving group substituent, which during perhydrolysis, actually cleaves off.

Perhydrolysis is the reaction which occurs when a peracid precursor or activator is combined in a reaction medium (aqueous medium) with an effective amount of a source of hydrogen peroxide.

The leaving group, L, is basically a substituent which is attached via an oxygen bond to the acyl portion of the ester and which can be replaced by a perhydroxide anion ($OOH^-$) during perhydrolysis.

The basic reaction is:

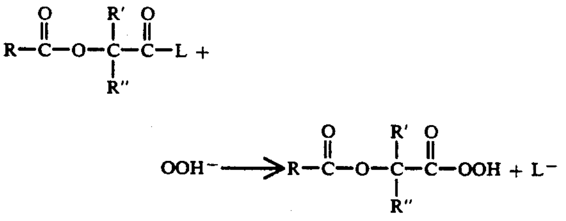

Although further discussion below will elaborate on the unique advantages of the preferred embodiment,

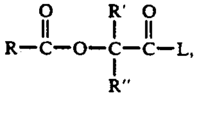

also referred to as a glycolate ester or as an acylglycolate ester, at present, the constituent portions of the ester, i.e., the acyl group and the leaving groups are herein defined.

R is defined as being $C_{1-20}$ linear or branched alkyl, alkoxylated alkyl, cycloalkyl, alkenyl, aryl, substituted aryl or alkylaryl.

It is preferred that R is $C_{1-20}$ alkyl or alkoxylated alkyl. More preferably, R is $C_{1-10}$, and mixtures thereof. R can also be mono-unsaturated or polyunsaturated. If alkoxylated, ethoxy $$(EO)-(-OCH_2CH_2) \text{ and propoxy } (PO)-(-OCH_2CH_2CH_2),$$

$$\begin{array}{c} CH_3 \\ | \\ -(-OCH_2CHCH_2) \end{array}$$

groups are preferred and can be present, per mole of ester, from 1-30 EO or PO groups, and mixtures thereof.

It is especially preferred for R to be from 4 to 17, most preferably 5 to 12, carbons in the alkyl chain. Such alkyl groups would be surface active and would be desirable when the precursor is used to form surface active peracids for oxidizing fat or oil based soils from substrates at relatively low temperatures.

It is further highly preferred for R to be aryl and $C_{1-20}$alkylaryl. A different type of bleaching compound results when aromatic groups are introduced onto the ester.

Alkyl groups can be generally introduced onto the ester via an acid chloride synthesis discussed in U.S. Pat. No. 4,778,618 and Ser. No. 07/635,409, of Rowland. Fatty acid chlorides such as hexanoyl chloride, heptanoyl chloride, octanoyl chloride, nonanoyl chloride, decanoyl chloride and the like provide this alkyl moiety. Aromatic groups can be introduced via aromatic acid chlorides (e.g., benzoyl chloride) or aromatic anhydrides (e.g., benzoic acid anhydride).

R' and R'' are independently H, $C_{1-10}$ alkyl, aryl, $C_{1-10}$ alkylaryl, and substituted aryl. When R' and R'' are both alkyl, aryl, alkylaryl, substituted alkyl, or mixtures thereof, preferably the total number of carbons of R'+R'' does not exceed about either 20, more preferably does not exceed about 18. Preferably, when R' or R'' are carbylene or arylene, the other is H (i.e., unsubstituted). Alkyl of about 1–4 are preferred. If substituted aryl, appropriate substituents include OH, $SO_3^-$, and $CO_2^-$; $NR_3^{a}+$ ($R^a$ is $C_{1-30}$ carbons, and preferably, two of $R^a$ are short chain ($C_{1-4}$) alkyls and one of $R^a$ is a long chain alkyl ($C_{8-30}$). Appropriate counterions include $Na^+$, $K^+$, etc. and appropriate negative counterions include halogen (e.g., $Cl^-$), $OH^-$ and methosulfate. It is preferred that at least one of R' and R'' be H, and most preferably, both (thus forming methylene).

U.S. Pat. No. 4,778,618 stressed the importance of the R' and R'' alpha, alpha substituents on the methylene of the acyl group. This is because the position of various substituents alpha to the proximal carbonyl is very important to the activators.

The leaving group, as discussed above, is basically capable of being displaced by perhydroxide anion in aqueous medium. Unlike prior art precursors, the activator is not limited to leaving groups having particular solubility or reactivity criteria due to the reactiveness of the acyl of the inventive precursor. It is, however, preferred that the conjugate acid of the leaving group have a $pK_a$ of between about 4 to 20, more preferably, about 6 to 15.

Thus, the preferred leaving groups, none of which are meant to limit the invention, include:

(a) phenol derivatives
(b) halides
(c) oxynitrogen leaving groups
(d) carboxylic acid (from a mixed anhydride)

(a) Phenol Derivatives

The phenol derivatives can be generically defined as:

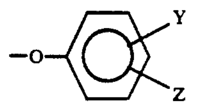

wherein Y and Z are, individually H, $SO_3M$, $CO_2M$, $SO_4M$, OH, halo substituent, $OR^1$, $R^2$, $NR_3{}^3X$, and mixtures thereof, wherein M is an alkali metal or alkaline earth counterion, $R^1$ of the $OR^1$ substituent is $C_{1-20}$ alkyl, $R^2$ is $C_{1-6}$ alkyl, $R_3{}^3$ of the $NR_3{}^3$ substituent is $C_{1-30}$ alkyl, X is a counterion therefor, and Y and Z can be the same or different.

The alkali metal counterions to sulfonate, sulfate or carbonate (all of which are solubilizing groups) include $K^+$, $Li^+$ and most preferably, $Na^+$. The alkaline earth counterions include $Sr^{++}$, $Ca^{++}$, $Ba^{++}$, and most preferably, $Mg^{++}$. Ammonium ($NH_4^+$) and other positively charged counterions may also be suitable. The halo substituent can be F, Br or most preferably, Cl. When $OR^1$, alkoxy, is the substituent on the phenyl ring, $R^1$ is $C_{1-20}$, and the criteria defined for R on the acyl group apply. When $R^2$ is the substituent on the phenyl ring, it is a $C_{1-10}$ alkyl, with preference given to methyl, ethyl, and iso-propyl, n-, sec and tert-butyl, which is especially preferred. When $-NR_3{}^3X$, quaternary ammonium, is the substituent, it is preferred that two of $R^3$ be short chain alkyls ($C_{1-4}$, most preferably, methyl) and one of the $R^3$ alkyls be longer chain alkyl (e.g., $C_{8-30}$), with X, a negative counterion, preferably selected from halogen ($Cl^-$, $F^-$, $Br^-$, $I^-$), $CH_3SO_4^-$ (methosulfate), $NO_3^-$, or $OH^-$.

Especially preferred are phenol sulfonate leaving groups. One synthesis of phenol sulfonate esters which could possibly be adapted for use herein is disclosed in Zielske, U.S. Pat. No. 4,735,740 commonly assigned to The Clorox Company, incorporated herein by reference. However, it is especially preferred to synthesize activators and phenyl sulfonate leaving groups using the techniques disclosed in co-pending application Ser. No. 07/648,838 filed concurrently herewith, entitled "METHOD FOR SULFONATING ACYLOXYBENZENES AND NEUTRALIZATION OF RESULTING PRODUCT," inventors Ottoboni et al., and of common assignment herewith, said application being incorporated herein by reference thereto.

It is to be noted that such technique in the Ottoboni et al. application is a so-called "post-sulfonation" process, wherein the desired compound is obtained by the following general reaction:

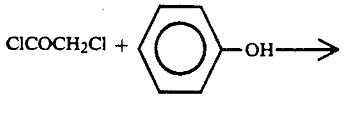

I.

-continued

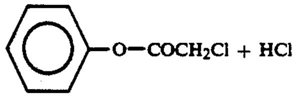

II.

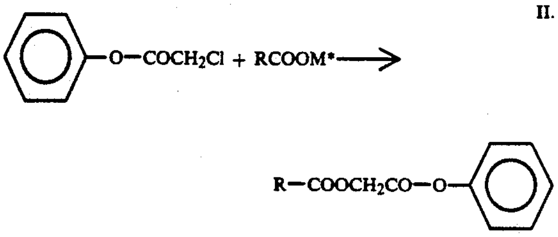

III.

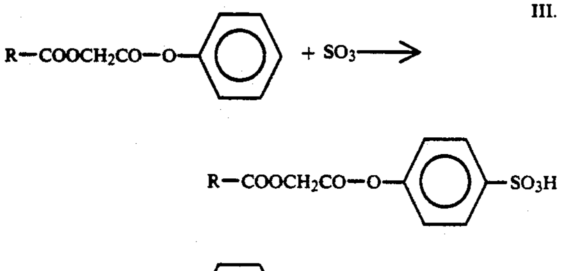

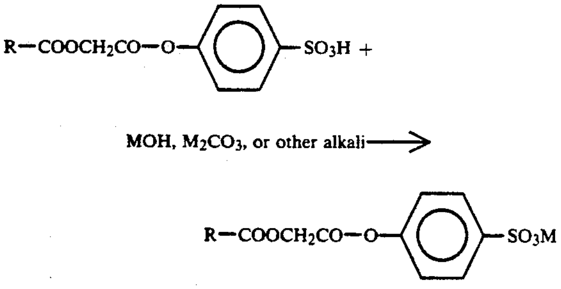

wherein, in the above formulae, R is an alkyl group, M* is either H or an alkali metal cation and M is an alkali metal cation.

Equation I provides the formation of the starting material, chloroacetoxybenzene, sometimes referred to as "CLAB," and is described in co-pending application Ser. No. 07/674,401, filed concurrently herewith, of Dumas et al, entitled Improved Process for Preparing Phenyl Chloroacetate.

Equation II provides the formation of the intermediate, alkanoyloxyacetyloxybenzene, (sometimes referred to herein as "NOGB" for a preferred exemplar, nonanoyloxyacetyloxybenzene) and is described in co-pending application Ser. No. 07/674,498, filed concurrently herewith, of Dumas et al, entitled Improved Process for Preparing Phenyl Esters of Substituted Acids.

Equations III and IV provide the sulfonation of the NOGB intermediate and the subsequent neutralization, to result in the acidic precursor, alkanoyloxyglycoylphenylsulfonic acid (sometimes referred to herein as "NOGPSA" for a preferred exemplar, nonanoylglycoylphenylsulfonic acid) and the desired end product, alkanoyloxyglycoylphenylsulfonate (sometimes referred to herein as "NOGPS" for a preferred exemplar, nonanoylglycoylphenylsulfonate).

These processes are described in co-pending application Ser. No. 07/674,400, now U.S. Pat. No. 5,153,341 filed concurrently herewith, of Dumas et al, entitled Improved Process for Preparing Benzenesulfonate salts, and especially, in the previously described application of Ottoboni et al., the latter application being wholly incorporated by reference thereto.

As will be later discussed, the preferred sulfonation and neutralization procedures described in Ottoboni et al., which use so-called "quenching agents" to dramatically improve yields of phenyl sulfonate esters, led to the discoveries of the need for the inventive solubilizing aids and stiffeners disclosed and claimed herein. Non-limiting preferred phenol derivatives, which function as leaving groups, are:

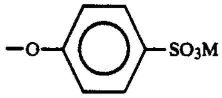
(sodium p-phenyl sulfonate)

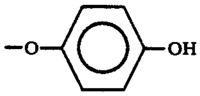
(p-, o-, or m-dihydroxybenzene)

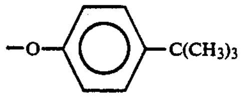
(t-butyl phenol)

The following description in (b), (c) and (d) below is of other leaving groups which may be desirable in the preparation of activators which could be used in the invention.

(b) Halides

The halide leaving groups are quite reactive and actually are directly obtained as the intermediates in the synthesis of the phenyl sulfonate and t-butylphenol esters. While halides include Br and F, Cl is most preferred. A non-limiting example is:

$Cl^-$ (chloride)

(c) Oxynitrogen

The oxynitrogen leaving groups are preferred. In Zielske, U.S. Pat. No. 4,957,647, incorporated herein by reference, a detailed description of the synthesis of these leaving groups is disclosed. These oxynitrogen leaving groups are generally disclosed as $—ONR^5$, wherein $R^5$ comprises at least one carbon which is singly or doubly bonded directly to N.

$—ONR^5$ is more specifically defined as:

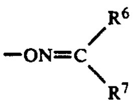

Oxime

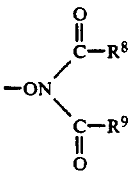

or

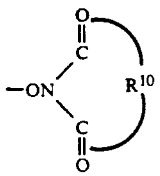

Hydroxyimide

-continued

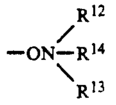 or 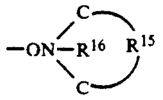

Amine Oxide

Oxime leaving groups have the structure

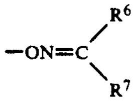

wherein $R^6$ and $R^7$ individually H, $C_{1-20}$ alkyl, (which can be cycloalkyl, straight or branched chain), aryl, or alkylaryl and at least one of $R^6$ and $R^7$ is not H. Preferably $R^6$ and $R^7$ are the same or different, and range from $C_{1-6}$. Oximes are generally derived from the reaction of hydroxylamine with either aldehydes or ketones.

Non-limiting examples of an oxime leaving group are: (a) oximes of aldehydes (aldoximes), e.g., acetaldoxime, benzaldoxime, propionaldoxime, butylaldoxime, heptaldoxime, hexaldoxime, phenylacetaldoxime, p-tolualdoxime, anisaldoxime, caproaldoxime, valeraldoxime and p-nitrobenzaldoxime; and (b) oximes of ketones (ketoximes), e.g., acetone oxime (2-propanone oxime), methyl ethyl ketoxime (2-butanone oxime), 2-pentanone oxime, 2-hexanone oxime, 3-hexanone oxime, cyclohexanone oxime, acetophenone oxime, benzophenone oxime, and cyclopentanone oxime.

Particularly preferred oxime leaving groups are:

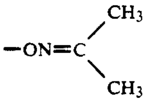
Acetone Oxime

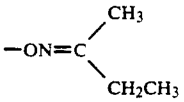
Methylethyl Ketoxime

Hydroxyimide leaving groups comprise:

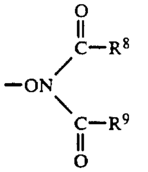 or 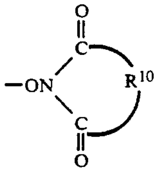

wherein $R^8$ and $R^9$ can be the same or different, and are preferably straight chain or branched $C_{1-20}$ alkyl, aryl, alkylaryl or mixtures thereof. If alkyl, $R^8$ and $R^9$ can be partially unsaturated. It is especially preferred that $R^8$ and $R^9$ are straight or branched chain $C_{1-6}$ alkyls, which can be the same or different. $R^{10}$ is preferably $C_{1-20}$ alkyl, aryl or alkylaryl, and completes a heterocycle. $R^{10}$ includes the preferred structure

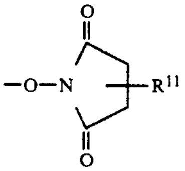

wherein $R^{11}$ can be an aromatic ring fused to the heterocycle, or $C_{1-6}$ alkyl (which itself could be substituted with water solubilizing groups, such as EO, PO, $CO_2^-$ and $SO_3^-$).

These esters of imides can be prepared as described in *Greene, Protective Groups in Organic Synthesis,* p. 183, (incorporated by reference) and are generally the reaction products of acid chlorides and hydroxyimides.

Non-limiting examples of N-hydroxyimide which will provide the hydroxyimide leaving groups of the invention include: N-hydroxysuccinimide, N-hydroxyphthalimide, N-hydroxyglutarimide, N-hydroxynaphthalimide, N-hydroxymaleimide, N-hydroxydiacetylimide and N-hydroxydipropionylimide.

Especially preferred examples of hydroxyimide leaving groups are:

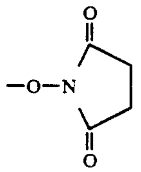
Oxysuccinimide

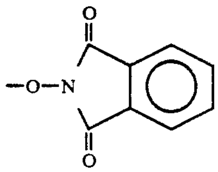
Oxyphthalimide

Amine oxide leaving groups comprise:

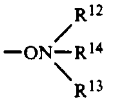 or 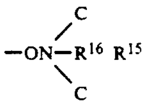

In the first preferred structure for amine oxides, $R^{12}$ and $R^{13}$ can be the same or different, and are preferably $C_{1-20}$ straight or branched chain alkyl, aryl, alkylaryl or mixtures thereof. If alkyl, the substituent could be partially unsaturated.

Preferably, $R^{12}$ and $R^{13}$ are $C_{1-4}$ alkyls and can be the same or different. $R^{14}$ is preferably $C_{1-30}$ alkyl, aryl, alkylaryl and mixtures thereof. This $R^{14}$ substituent could also be partially unsaturated. It is most preferred that $R^{12}$ and $R^{13}$ are relatively short chain alkyl groups ($CH_3$ or $CH_2CH_3$) and $R^{14}$ is preferably $Cl_{1-20}$ alkyl, forming together a tertiary amine oxide.

Further, in the second preferred amine oxide structure, $R^{15}$ can be $C_{1-20}$ alkyl, aryl or alkylaryl, and completes a heterocycle. $R^{15}$ preferably completes an aromatic heterocycle of 5 carbon atoms and can be $C_{l-6}$ alkyl or aryl substituted. $R^{16}$ is preferably nothing, $C_{1-30}$ alkyl, aryl, alkylaryl or mixtures thereof. $R^{16}$ is more preferably $C_{1-20}$ alkyl if $R^{15}$ completes an aliphatic heterocycle. If $R^{15}$ completes an aromatic heterocycle, $R^{16}$ is nothing.

Non-limiting examples of amine oxides suitable for use as leaving groups herein can be derived from: pyridine N-oxide, trimethylamine N-oxide, 4-phenyl pyridine N-oxide, decyldimethylamine N-oxide, dodecyldimethylamine N-oxide, tetradecyldimethylamine N-oxide, hexadecyldimethylamine N-oxide, octyldimethylamine N-oxide, di(decyl)methylamine N-oxide, di(-dodecyl)methylamine N-oxide, di(tetradecyl)methylamine N- oxide, 4-picoline N-oxide, 3-picoline N-oxide and 2-picoline N- oxide.

Especially preferred amine oxide leaving groups include:

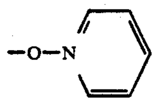

Pyridinium N-oxide

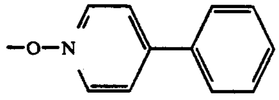

Phenylpyridinium N-oxide (d) Carboxylic Acids from Mixed Anhydrides

Carboxylic acid leaving groups have the structure

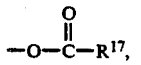

wherein $R^{17}$ is $C_{1-10}$ alkyl, preferably $C_{1-4}$ alkyl, most preferably either $CH_3$ or $CH_2CH_3$ and mixtures thereof.

When $R^{17}$ is $C_1$ and above, it is believed that the leaving groups will form carboxylic acids upon perhydrolytic conditions. Thus, when $R^{17}$ is $CH_3$, acetic acid would be the leaving group; when $CH_2CH_3$, propionic acid would be the leaving group, and so on. However, the foregoing theory is non-binding and offers only one explanation for whiat may be a very complicated reaction.

Non-limiting examples of mixed anhydride esters include:

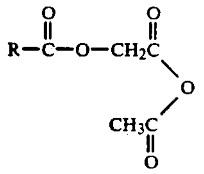

Alkanoyloxy acetic/acetic acid mixed anhydride;

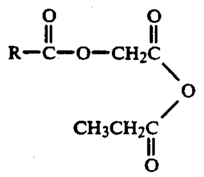

Alkanoyloxyacetic/Propionic acid mixed anhydride.

Advantages of the Stable Bleach Activator

As previously described in U.S. Pat. No. 4,778,618, the activator provides numerous advantages over the prior art. For one, the activator is not tied to critical ratios of hydrogen peroxide source to activator, as are the fatty acid esters of Chung et al., U.S. Pat. No. 4,412,934. Additionally, because the activator presents multiple acyl functionalities, it can provide more than one type of peracid, thus boosting performance in laundering applications. For instance, a preferred activator, octanoyloxyacetate, phenol sulfonate ester, can give rise to three different peracids:

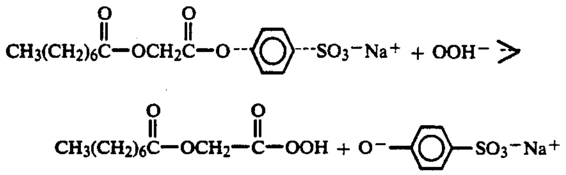

I. peroctanoyloxyacetic acid

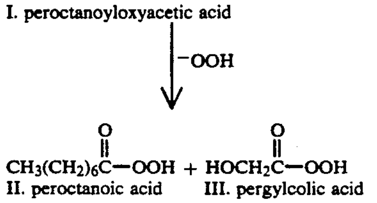

II. peroctanoic acid III. pergylcolic acid

Additionally, yet another preferred compound, nonanyoyloxyacetate, phenyl sulfonate ester, also referred to as nonanoylglycoylphenylsulfonate, or "NOGPS," provides commensurate advantages.

The prior art materials cannot provide these advantages.

For instance, one facially similar, but entirely inferior activator is disclosed in Schirmann et al., U.S. Pat. No. 4,221,675. A product coming within Schirmann et al's disclosure was synthesized, alpha-octanoyl, N-acetylacetamide, and perhydrolysis studies were conducted to see what reactions were being generated. In conducting the study, it was assumed that perhydrolytic attack on the compound could take place at one or all or a combination of three sites:

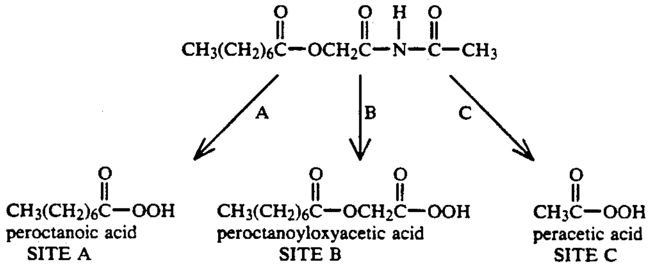

peroctanoic acid SITE A peroctanoyloxyacetic acid SITE B peracetic acid SITE C

Three moles of hydrogen peroxide per mole of activator (one per carbonyl site) were reacted with this alpha-octanoyloxy, N-acetylacetamide.

Tallying the reaction products via high performance liquid chromatography (HPLC) using an adaptation of the potentiometric methods set forth in Isaakson et al, "Reaction Detector for Liquid Chromatography with Electrochemical Generation and Detection of Excess of Bromine," *J. Chromatography,* Vo. 324, pp. 333 et seq. (1986), the results were:

TABLE I

Perhydrolysis Profile[1] of α-octanoyloxy, N-acetylacetamide

| Peracid/Product | Site | pH 10.5 | pH 9.5 | pH 8.5 |
|---|---|---|---|---|
| Peroctanoic Acid | A | 27.3% | 8.60% | 0.83% |
| Peroctanoyloxyacetic Acid | B | 2.1% | 0.59% | 0.00% |
| Peracetic Acid | C | 9.1% | 5.3% | 0.20% |
| Octanoyloxyacetic Acid | hydrolysis | 55.0% | n/a[2] | n/a[2] |

TABLE I-continued

Perhydrolysis Profile[1] of α-octanoyloxy, N-acetylacetamide

| Peracid/Product | Site | pH 10.5 | 9.5 | 8.5 |
|---|---|---|---|---|
| | at B | | | |

[1]Assuming three perhydrolytic sites, 14 ppm A.O. theoretical maximum yield. HPLC at 13 minutes.
[2]not available Review of the above discloses that the major reaction of the compound alpha-octanoyloxy, N-acetylacetamide is hydrolysis, not perhydrolysis. Additionally, primary sites for perhydrolysis are at a and c, meaning that site b is very inefficient. This is to be compared with one of the preferred activators, octanoyloxy acetic acid, phenyl sulfonate ester, which has the majority of perhydrolysis at site B, little at site A:

TABLE II

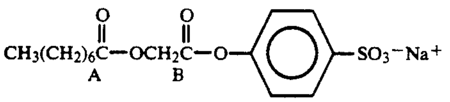

Perhydrolysis Profile of[1] Octanoyloxyacetic Acid, Phenyl Sufonate Ester

| Peracid/Product | pH $10.5^2$ | $10.5^3$ | $9.5^4$ | $8.5^5$ |
|---|---|---|---|---|
| Peroctanoic Acid | 4% | 10% | 4% | 3% |
| Peroctanoyloxyacetic Acid | 59% | 55% | 62% | 41% |
| Perglycolic Acid | 5% | 11% | 3% | 3% |
| Octanoyloxyacetic Acid | 23% | 15% | 15%[6] | 32% |

[1]Data obtained from HPLC; 2:1 peroxide:precursor ratio; based on two minutes from start from perhydrolysis.
[2]Initial precursor concentration: 0.8 mM
[3]Initial precursor concentration: 6.0 mM
[4]Initial precursor concentration: 6.0 mM
[5]Initial precursor concentration: 6.0 mM
[6]Estimated.

Nakagawa et al., U.S. Pat. No. 3,960,743, discloses contended bleach activators of the structure:

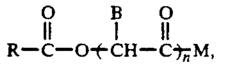

in which B is H or $C_{1-3}$ alkyl, M is $Cl_{1-4}$ alkyl, H, or alkali metal salt. This structure can be divided into two categories: (1) when M is $C_{1-4}$ alkyl, n can be 1, thus providing an alkyl ester of acylglycolic acid; and (2) when M is H or alkali metal salt, n must be greater than 1, thus the compound must be polymeric.

In the case of (1), M completing an alkyl ester, it is clear that M does not function as a leaving group. Alkyl alcohols are not leaving groups.

In the case of (2), M is H or alkali metal salt, these again do not function as leaving groups.

In the case where M is H or alkali metal, salt, a compound whihc is representative of Nakagawa et al, namely, octanoylocyacetic acid, was tested for perhydrolytic performance. (If placed in an alkaline medium, this acid would be neutralized, i.e., deprotonated, and would form the alkali metal salt. Thus, this compound is representative of either M is H or alkali metal salt.) Octanoyloxyacetic acid has the structure

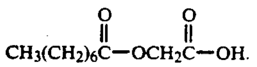

The compound can be synthesized as described in U.S. Pat. No. 4,778,618.

In testing this representative compound, the following conditions were used:

| | | |
|---|---|---|
| Octanoyloxyacetic Acid: | $8.7 \times 10^{-4}$ M | (dissolved in 3 ml of 50/50 vol./vol. dioxane/water) |
| Hydrogen Peroxide: | $1.65 \times 10^{-3}$ M | |
| Temperature: | 21° C. | |
| pH: | 10.5 | |
| Buffer: | 0.02 M | ($Na_2CO_3/NaHCO_3$) |

This, 1.9 moles of $H_2O_2$ per mole of this "activator" were placed in aqueous solution.

Tallying the reaction products via high performance liquid chromatography (HPLC) using an adaptation of the potentiometric methods set forth in Isaakson et al, "Reaction Detector for Liquid Chromatography with Electrochemical Generation and Detection of Excess of Bromine," *J. Chromatography,* vol. 324, pp. 333 et seq. (1986), the results were:

TABLE III

Perhydrolysis Profile of Octanoyloxyacetic Acid

| Time (min.) | Total A.O.[1] Concentration | Peracid[2] Concentration | Octanoyloxyacetic Acid[3] Concentration |
|---|---|---|---|
| 5 | 1.76 mM | N/D[4] | 0.85 mM |
| 10 | 1.52 mM | N/D[4] | 0.84 mM |
| 20 | 1.64 mM | N/D[4] | 0.88 mM |

[1]Total Active Oxygen ("AO") concentration (mM) determined by iodide/thiosulfate titration using molybdate catalyst; includes $H_2O_2$ and peracids.
[2]Peracid concentration (mM) determined by iodide/thiosulfate titration after treatment with catalase enzyme to eliminate the hydrogen peroxide.
[3]Concentration (mM) measured by HPLC.
[4]Not detected; additionally, no peracids were detected by HPLC (detection limit is 0.001 mM).

Thus, as seen from the above, neither Schirmann et al. nor Nakagawa et al. provide the benefits of the activators of the invention.

Stable Beach Activator Granules

While it has bee disclosed by Applicants in the parent application, that combining the activator with a suitable binding material to result in granules which are stable upon storage and which form peracid more efficiently, the present invention departs from the parent in the use of various additives to improve solubility and durability.

In the parent application, the granules are formed by combining the hereinbefore described activators with pliable binding materials having a melting completion temperature of at least about 40° C. Preferably, a filler material was included which could control solubility of the granule and for good handling characteristics. The following discussion in 1-2 below reviews these preferred binder and filler materials.

Binder Material

The binder material is critical to the invention. It should be an organic material which has a melting completion temperature (melting point) above about 40° C., more preferably above about 50° C. The material should not react with either the activator, or, if the granules are combined with an oxidant-containing detergent, with the components of such detergent during storage thereof. The binder should ideally irreversibly bind water, yet be soluble or dispersible in aqueous solution, preferably at low temperatures. The binder should also be able to form a paste or doughy mass suitable for forming noodles, and after processing, granules. Workability, viscosity, pliability, and miscibility in water, of the binder should be optimal, depending on the process used.

Types of materials suitable for use include, without limitation:

Organic Materials

1. Nonionic Surfactants.
2. Anionic Surfactants.
3 Cationic Surfactants.
4. Film-forming polymers.
5. $C_{12}$-$C_{18}$ Fatty acids or salts thereof.
6. $C_{12}$-$C_{24}$ Aliphatic alchols.
7. Relatively low molecular weight polyethylene glycols (2,000-10,000).
8. Sodium alkyl glyceryl ether sulfonate (sodium coconut oil, fatty acids monoglyceric sulfonates and sulfates); sodium alkyl ether sulfonates; alkylphenol-ethylene oxide ether sulfate; and esters of alpha-sulfonated fatty acid.
9. Acrylic acid, hydroxyacrylic acid, methacrylic acid polymers; co-polymers of ethylene styrene and vinyl methyl ether (e.gs., Versicol & Gantrez).
10. Cellulose acetate esters, cellulose acetate sulfate, cellulose sulfates, hydroxyethyl cellulose sulfate, methylcellulose sulfate, hydroxypropylcellulose sulfate.
11. Starch, starch/ether.
12. Sodium carboxymethyl cellulose.
13. Polyvinyl alcohol.
14. Gelatin.
15. HPL (National Starch & Chemical Corp., (an amylopectin food starch).
16. Cross-linked pre-gelatinized amylose (e.g., Clearjel, National Starch & Chemical Corp.).

The binder material imparts physical integrity to the particle which is important in particle crush durability. Although organic binders are preferred, certain silicates may also be suitable for use. Other binders disclosed in Chung et al., EP 106 634 (incorporated herein by reference) are suitable for use. The binder also aids in the dispersion of the particle and solubilization of the precursor. Preferred binder materials were selected from the following classes of compounds: Calsoft F90, Calsoft L40 and Biosoft D62 from the linear alkylbenzene sulfonates; Carbowax 3350, 4600, 8000 and 20000, from polyethylene glycols; Span 40 from substituted sorbitans; Triton CF54 from alkyl aryl polyethoxy adducts; Pluronic F125 from block copolymers of propylene and ethylene oxide; Alfonic 1618-80, Brij-58, and Neodol 45-13 from ethoxylated alcohols; sodium palmitate from fatty acid salts; and polyacrylic acid. Of these the Calsoft materials, Alfonic I1618-80 and Carbowax 4600 (polyethylene glycol, Mol. wt.=4,600) were found to be most preferred. The especially preferred binding materials consist of a 50/50 wt./wt. combination of Calsoft L40 (a $C_{11.5}$ linear alkyl benzene sulfonate, sodium salt, 40% active, from Pilot Chemical Co.) and Alfonic 1618-80 (a $C_{16-18}$ ethoxylated aloohol, with about 10.7 moles of ethylene oxide per mole of alcohol, 100% active, from Vista Chemicals); and Carbowax 4600 and Calsoft L40 in 50/50 wt./wt. mixture, based on actives.

As discussed further below, some of the binder materials herein may actually be formed in situ during the sulfonation and neutralization of appropriate intermediates to one of the most desirable activators, alkanoyloxyacetyloxyphenyl sulfonate, when the method described in the co-pending application of Ottoboni et al. is utilized. For example, when the quenching agent, as therein defined, used is linear alkyl benzene, the agent, when also sulfonated and neutralized along with the intermediate, favorably produces the binder linear alkyl benzene sulfonate (LAS).

Additional preferred binder additives include sodium polyacrylate (e.g., Acusol, Rohm & Haas), microcrystalline waxes (e.gs., Michem LUBE 124, Michem Emulsion 48040 and Michem Emulsion 04010, from Michelman Corp.) and mixtures thereof.

2. Filler/Diluent

A filler or diluent can be used to control solubility of the granule and to assure optimal processibility of the noodle. The diluent also helps in the dispersion of the precursor by allowing the particles to break up more readily when placed into an aqueous medium. The nature of the diluent should be such that it does not react with the other components of the particles, is readily soluble, not highly hygroscopic and can be powdered to the same mesh size as the precursor. The filler is any inert salt such as $Na_2SO_4$, $Na_2CO_3$, $NaHCO_3$, boric acid, borax, and other alkali metal salts. It is preferable that water-insoluble materials be limited, e.g., $CaCO_3$, $MgCO_3$, etc.

3. Forming the Granules

In the parent application, the activator, binder and diluent/filler were combined, usually with additional water (although some binders, e.g., surfactants, are supplied by manufacturers as aqueous solutions, so the amount of added water can be limited or varied as needed) in order to form a workable paste or doughy mass.

The process of preference was referred to as extrusion, in which material as hereinbefore described was processed into a doughy mass and extruded through a dieplate or other sizing means to form long noodles. Such noodles were then dried and chopped or spheronized or otherwise formed into granules. Alternatively, the granules could be formed by agglomeration or spray bed process, both of which form a part of the invention.

In the parent application, the noodles were prepared by first dry mixing the solid components of the formulation, which includes activator, diluent, and optional colorant, to form an evenly distributed dry powder. This mixture was then added to a fluid hot melted binder or to a warm aqueous solution of binder to form a doughy mass. The doughy mass could be further moistened to aid processing by the addition of 2-15% water by weight of the mixture. The substantially homogeneous mass was then extruded through a 0.25mm-2mm diameter die hole. Noodle extrudate was then dried to a water content of preferably less than 3% by weight of the processed noodle unless $MgSO_4$ was not present, in which case, the content was less than about 1%. The dried noodles were then chopped down to lengths not greater than 5 mm, preferably 1-2mm.

By reference to FIG. 1, a flow diagram of the process, a simplified description of a non-limiting embodiment of the process can be demonstrated. The dry components (activator, diluent and optional colorant) were dry-mixed to form a dry preblend 2. Secondly, the liquid components (surfactants, polymers, i.e., binders, and water) were mixed to form a liquid preblend 4. These two product streams were added in a mixer 6 which forms the doughy mass. The mass was passed through to an extruder 8. In practice, the mixer 6 and the extruder 8 can be combined in one apparatus. This can comprise an inverted-funnel-shaped hopper provided with screws in the bottom thereof. The screws would work the mass and channel it to a die plate, grate, or other means of reducing the mass size. As the mass was forced out of the die, it produced long "noodles," which then fell into a sizer 10. The sizer can be a shaker bed, which is a vibrating bed which breaks the noodles up into the desired shapes and sizes of granules. The sizer could alternatively be a set of vibrating knife blades that cut the noodles as they pass through the die, in which case the process can be continuous. The fines were collected by screening and recycled. For example, the fines, particles less than about 0.1 mm in length, could be shaken off to a collector 12, which preferably recycles the fines to the extruder 8. The granules could then be dried in a drier 16, then outputted to a collector 18, with fines again siphoned off via a fines collector 14, which preferably recycles such fines. The finished granules 20 were then packaged or further taken via conveyor to be combined with a detergent base, or an oxidant base, as desired.

The foregoing process description lays out a very desirable method for noodling the desired granules when the activator, usually an alkanoyloxyacetyloxyphenyl sulfonate, was first provided as a dry powder, as for example, under the synthesis methods first described in U.S. Pat. No. 4,778,618. However, because such powders, when combined with the binders described in 1. Binder Materials, above, usually had a relatively low water content, the resulting granules were found to have excellent crush strength properties, as shown below in the EXPERIMENTAL section, e.g., TABLE IV. In fact, it was also experienced that it was often desirable to add additional solubility materials, such as those discussed in 5. Solubilizing Aids, below.

In an alternate, but preferred method of forming the inventive activator granules, the synthesis of a preferred activator, alkanoyloxyglycoylphenyl sulfonate, and the "noodling" step could be combined. In co-pending application Ser. No. 07/648,839, filed concurrently herewith, entitled "METHOD OF PREPARING ALKANOYLOXYGLYCOYLPHENYL SULFONATES AND NEUTRALIZATION OF RESULTING PRODUCTS," inventors Ottoboni et al., of common assignment, it is described how in the use of toluene and linear alkyl benzene as quenching agents in the synthesis of the phenyl sulfonate precursor, sulfonation and neutralization of the quenching agents desirably results in sodium toluene sulfonate and linear alkyl benzene sulfonate, respectively. Accordingly, these two respective solubility and binding agents will combine with the phenyl sulfonate precursors to form the inventive noodles. As can be well appreciated, the benefit of such procedure is that the separate addition of solubility and/or binding agents can be avoided, resulting in very significant processing advantages and materials costs savings. However, as also described in such co-pending application of Ottoboni et al., the sulfonation and neutralization procedures therein additionally resulted in very high yields of the desired precursor. Additionally, the use of the preferred synthesis in said application of Ottoboni et al. resulted in other challenges to applicants. For example, this synthesis usually resulted in precursors of an amorphous phase whereas those under the prior synthesis, e.g., of U.S. Pat. No. 4,778,618, were crystalline in nature. This preferred synthesis resulted in noodles which are stickier, more elastic, and less durable than those produced via the prior synthesis. Accordingly, it was found desirable to add so-called "stiffening materials," such as those described in 6. Stiffeners, below.

4. The Granules

The granules provided by the teachings of the parent application had increased storage stability over unprocessed precursor, good crush durability properties and dissolve readily in the wash water. Such noodle particles preferably comprise from 50–99, more preferably 80–97 percent precursor, from 0.5–25 more preferably 3–15, percent binder, from 0–25, more preferably 0–5, most preferably 0.1–5, percent diluent and from 0–20 percent water based on the weight of the processed noodle. An optional colorant can also be present in the noodle in the range of from 0–5 percent by weight of the processed noodle. All ingredients of this particle composition are evenly distributed throughout the particle.

The granule size is an important factor in storage stability and solubility of the particle. It is preferred that the noodles have a diameter in the range of 2 to 0.25, more preferably 1.5 to 0.3, most preferably 1.0 to 0.5 mm. Optimally, they will be 0.75 mm in diameter. The length of the particle is preferred to be from 0.1 to 5 mm, more preferably 0.5 to 3 mm long. The particles are preferably cylindrical in shape. Alternatively, they may be spherical, with the preferred diameters given above.

In the granules, the proportions of ingredients should be preferably between 99:0.5:0.5 to 50:25:25 activator: binder: diluent, more preferably 98:1:1–75:12.5:12.5. High amounts of activator are desirable in order to enhance the finished product's performance and to reduce the overall percentage of activator granules in the detergent for cost efficiency. The particles should dissolve in water within about 10 minutes at 21° C.

However, as a result of utilizing the preferred method for preparing phenyl sulfonate esters in Ottoboni et al., it was additionally discovered that there was a need to include additional materials within the finished noodles/granules. For example, where solubility was problematic, it was found that the solubilizing aids of 5 below significantly enhanced solubility, although the noodles produced by the Ottoboni et al. method have improved solubility versus the prior method of manufacture. Where durability of the particle was a concern, for example, where linear alkyl benzene was used as the quenching agent in making the phenyl sulfonate esters, stiffeners as in 6 below were found to significantly improve such durability. In this execution, the preferred precursor content is 10–99%, more preferably 20–99% and most preferably 30–99%.

The Solubilizing Aids

A preferred solubilizing aid is selected from the group consisting of magnesium sulfate, alkali aryl sulfonate, polyvinyl pyrrolidone and mixtures thereof. Although each of additives has been used for diverse purposes in the art, their use as solubilizing aids in the context of granules containing the inventive activators has been heretofore not been disclosed, taught or suggested.

Magnesium sulfate is a common, neutral hydratable inorganic salt. It is available from Malinckrodt. $MgSO_4$ is used herein as alkanoyloxyacetyloxyphenylsulfontate, is of crystalline nature. This because it has been found that the solubility of noodles made of such precursors can be surprisingly improved by such inclusion. The use of $MGSO_4$ is distinct from its use in noodles containing precursors made by the Ottoboni et al. synthesis. There, it is used a stabilizing and stiffening aid, as furthe described in 6. Stiffers, below.

The alkali aryl sulfonates can be selected from sodium, aryl sufonates are selected from the group consisting of cumene sulfonate, toluene sulfonate, xylene sulfonate, benzene sulfonate, and the like. They are commonly referred to as hydrotropes. In the case of the preferred granules, they can either be post-added, or, in the instance where toluene is used as the organic quenching agent in the Ottoboni et al. procedure, the tolune sulfonate can be created in situ. There are many manufacturers of these aryl sulfonates, such as e.g., Stepanate SXS, from Stepan Chemical Company.

The polyvinyl pyrrolidones are available from GAF Corporation. They have a preferred molecular weight range of 5,000 to 50,000, more preferably 10,000 to 20,000.

These materials should be present in the inventive granules at about 0 to 50%, more preferably 0.5 to 25%, and most preferably at about 0.5 to 15, by weight of the granule.

6. Stiffeners

When the preferred procedure for making the desired activators, alkanoyloxyglycoylphenyl surfonate esters, as disclosed on the co-pending application of Ottoboni et al., was used, it was found that the resulting noodles could be quite soft and pliable. In order to stiffen or rigidify such noodles, it was found necessary to resort to stiffeners. Calcium or magnesium silicate were found to satisfy this requirement. Other silicas may be acceptable, such as fumed or precipitated silica. Magnesium or calcium silicate are typically used to fortify masonry, concrete, and other materials. Yet, use of these materials in the inventive granules was found to dramatically improve their durability while not significantly affecting solubility. These magnesium or calcium silicates also advantageously absorb liquids in order to further bolster the noodles. Moreover, the use of such materials may even help to disperse the inventive granules in the aqueous wash medium since they may make the granules more "fragile." A source of the preferred calcium silicate stiffener is Micro Cel C or Silasorb from Celite Corporation.

These stiffeners should be present in an amount of preferably 0.1-50%, more preferably 1-20%, and most preferably 3-7%, by weight of the granule.

Additionally, in some instances, where the method of Ottoboni et al. is used to produce the inventive noodles, a further co-stiffener, or co-binder, adjunct may be needed. In such case, materials which have heretofore been described within as fillers or even binders serve now a different purpose: rather than assist primarily in solubilization of binding, they will function as rigidifiers. And while it may appear that some of these materials may overlap with other defined additives herein, applicants have only intended the use of materials for this particular discrete purpose. Thus, further co-stiffeners include herein carboxymethylcellulose, sodium toluene sulfonate or other aryl sulfonates, sodium silicate, sodium sulfate, magnesium sulfate, ligninsulfonate (e.g., Kelig), stearic acid, cyclodextrin, xanthan gum, guar gum, microcrystalline waxes, monoglycerides, and polyacrylates (e.g., Carbopol).

7. The Bleach or Detergent Compositions

The activator granules of the invention are combined with an oxidant bleach or detergent base, said base comprising:

builders; and optionally, a surfactant selected from the group consisting of anionic, nonionic, cationic, amphoteric, zwitterionic surfactants, and mixtures thereof; and a bleach-effective amount of a source of hydrogen peroxide to interact with the activator granules.

Each of these components, and adjunct materials suitable for use herein are further discussed below:

8. Builders

The builders are typically alkaline builders, i.e., those which in aqueous solution will attain a pH of 7-14, preferably 9-12. Examples of inorganic builders include the alkali metal and ammonium carbonates (including sesquicarbonates and bicarbonates), phosphates (including orthophosphates, tripolyphosphates and tetrapyrophosphates), aluminosilicates (both natural and synthetic zeolites), and mixtures thereof. Carbonates are especially desirable for use in this invention because of their high alkalinity and effectiveness in removing hardness ions which may be present in hard water, as well as their low cost. Carbonates can be used as the predominant builder. Silicates ($Na_2O$:$SiO_2$, modulus of 4:1 to 1:1, most preferably about 3:1 to 1:1) can also be used. Silicates, because of their solubility in water and ability to form a glassy matrix, can also be advantageously used as a binder for the detergent.

Organic builders are also suitable for use, and are selected from the group consisting of the alkali metal and ammonium sulfosuccinates, polyacrylates, polymaleates, copolymers of acrylic acid and maleic acid or maleic anhydride, citrates and mixtures thereof.

9. Fillers/Diluents

The same materials as used in the manufacture of the granules can be used herein as fillers for the detergent. Salts such as NaCl, $Na_2SO_4$, and borax, are preferred. Organic diluents, such as sugar, are possible.

10. Surfactants

Surfactants will generally be added to detergent formulations for removal of particular targeted soils, e.g.s., noninic surfactants on oily soils, and anionic surfactants on particulate soils. However, oxidant bleach compositions may contain little or even no surfactant.

Particularly effective surfactants appear to be anionic surfactants. Examples of such anionic surfactants may include the ammonium, substituted ammonium (e.g., mono-, di-, and tri-ethanolammonium), alkali metal and alkaline earth metal salts of $C_6$-$C_{20}$ fatty acids and rosin acids, linear and branched alkyl benzene sulfonates, alkyl sulfates, alkyl ether sulfates, alkane sulfonates, olein sulfonates, hydroxyalkane sulfonates, acyl monoglyceride sulfates, alkyl glyceryl ether sulfates, acyl sarocinates and acyl N-methyltaurides. Preferred are aromatic sulfonated surfactants. Of particular preference are linear and branched $C_{6-8}$ alkyl benzene sulfonates, both the salts thereof as well as the acidic form. Most preferred are the acidic alkyl benzene sulfonates such as Biosoft S100 and S120, with the latter especially preferred.

Other preferred surfactants of use include linear ethoxylated alcohols, such as those sold by Shell Chemical Company under the brand name Neodol. Other suitable nonionic surfactants can include other linear ethoxylated alcohols wit an average length of 6 to 16 carbon atoms and averaging about 2 to 20 moles of ethylene oxide per mole of alcohol; linear and branched, primary and secondary 6 to 16 carbon atoms and averaging 0–10 moles of ethylene oxide and about 1 to 10 moles of propylene oxide per mole of alcohol; linear and branched alkylphenoxy (polyethoxy) alcohols, otherwise known as ethoxylated alkylphenols, with an averge chain length of 8 to 16 carbon atoms and averaging 1.5 to 30 moles of ethylene oxide per mole of alcohol; and mixtures thereof.

Further suitable nonionic surfactants may include polyoxyethylene carboxylic acid esters, fatty acid glycerol esters, fatty acid and ethoxylated fatty acid alkanolamides, certain block copolymers of propylene oxide and ethylene oxide, and block polymers of propylene oxide and ethylene oxide with propoxylated ethylene diamine. Also included are such semi-polar nonionic surfactants like amine oxides, phosphine oxides, sulfoxides, and their ethoxylated derivatives.

Suitable cationic surfactants may include the quaternary ammonium compounds in which typically one of the groups linked to the nitrogen atom is a $C_{12}$–$C_{18}$ alkyl group and the other three groups are short chained alkyl groups which may bear substituents such as phenyl groups.

Further, suitable amphoteric and zwitterionic surfactants which contain an anionic water-solubilizing group, a cationic group and a hydrophobic organic group may include amino carboxylic acids and their salts, amino dicarboxylic acids and their salts, alkylbetaines, alkyl aminopropylbetaines, sulfobetaines, alkyl imidazolinium derivatives, certain quaternary ammonium compounds, certain quaternary phosphonium compounds and certain tertiary sulfonium compounds. Other examples of potentially suitable zwitterionic surfactants can be found described in Jones, U.S. Pat. No. 4,005,029, at columns 11–15, which are incorporated herein by reference.

Further examples of anionic, nonionic, cationic and amphoteric surfactants which may be suitable for use in this invention are depicted in Kirk-Othmer, *Encyclopedia of Chemical Technology,* Third Edition, Volume 22, pages 347–387, and *McCutcheon's Detergents and Emulsifiers,* North American Edition, 1983, which are incorporated herein by reference.

As mentioned hereinabove, other common detergent adjuncts may be added if a bleach or detergent bleach product is desired. If, for example, a detergent composition is desired, the following ranges (weight %) appear practicable:

| | |
|---|---|
| 0.5–50.0% | Hydrogen Peroxide Source |
| 0.05–25.0% | Precursor |
| 1.0–50.0% | Surfactant |
| 1.0–50.0% | Builder |
| 5.0–99.9% | Filler, stabilizers, dyes, Fragrances, brighteners, etc. |

11. Hydrogen Peroxide Source

The hydrogen peroxide source may be selected from the alkali metal salts of percarbonate, perborate, persilicate and hydrogen peroxide adducts.

Most prefererd are sodium percarbonate, and sodium perborate mono- and tetrahydrate. Other peroxygen sources may be possible, such as alkaline earth and alkali metal peroxides, monopersulfates and monoperphosphates.

The range of peroxide to activators is preferably determined as a molar ratio of peroxide to activator. Thus, the range of peroxide to each activator is a molar ratio of from about 1:1 to 20:2, more preferably about 1:1 to 10:1 most preferably about 1:1 to 5:1. This is also the definition of a bleach effective amount of the hydrogen peroxide source. It is preferred that this activator peroxide composition provide about 0.5 to 100 ppm peracid A.O., and most preferably about 1 to 50 ppm peracid A.O., and most preferably about 1 to 20 ppm peracid A.O., in aqueous media.

A description of, and explanation of, A.O. measurement is found in the article of Sheldon N. Lewis, "Peracid and Peroxide Oxidations," In: *Oxidation,* 1969, pp. 213–258, which is incorporated herein by reference. Determination of the peracid can be ascertained by the analytical techniques taught in *Organic Peracids,* (Ed. by D. Swern), vol. 1, pp. 501 et seq. (Ch.7) (1970), 12. Chelating Agents In some of the compositions herein, it is especially preferred to include a chelating agent, most preferably, an aminopolyphosphonate. These chelating agents assist in maintaining the solution stability of the peracids in order to chelate heavy metal ions, which cause catalyzed decomposition of the in situ formed peracid, although this is a non-binding theory of their action and not limiting to Applicants. The chelating agent is selected from a number of known agents which are effective at chelating heavy metal ions. The chelating agent should be resistant to hydrolysis and rapid oxidation by oxidants. Preferably, it should have an acid dissociaton constant ($pK_a$) of about 1–9, indicating that it dissociates at low pH's to enhance binding to metal cations. The most preferred chelating agent is an aminopolyphosphonate which is commercially available under the trademark Dequest, from Monsanto Company. Examples thereof are Dequest 2000, 2041 and 2060. (See also Bossu, U.S. Pat. No. 4,473,507, column 12, line 63 through column 13, line 22, incorporated herein by reference). A polyphosphonate, such as Dequest 2010, is also suitable for use. Other chelating agents, such as ethylenediaminetetraacetic acid (EDTA) and nitrilotriacetic acid (NTA) may also be suitable for use. Still other new, preferred chelating agents are new propylenediaminetetraacetates, such as Hampshire 1,3 PDTA, from W.R. Grace, and Chel DTPA 100#F, from Ciba-Geigy A.G. Mixtures of the foregoing may be suitable. Effective amounts of the chelating agent range from 1–1,000, more preferably 5–500, most preferably 10–100, ppm chelating agent, in the wash liquor.

12. Adjuncts

The standard detergent or oxidant bleach adjuncts can be included in the present invention.

These include enzymes are especially desirable adjunct materials in these detergent or oxidant bleach products. However, it may be preferred to include an enzyme stabilizer.

Proteases are one especially preferred class of enzymes. They are selected from acidic, neutral and alkaline proteases. The terms "acidic," "neutral," and "alkaline," refer to the pH at which the enzymes' activity are optimal. Examples of neutral proteases include Milezyme (available from Miles Laboratory) and trypsin, a naturally occurring protease. Alkaline proteases are available from a wide variety of sources, and are typically produced from various microorganisms (e.g., *Bacillis subtilisis*). Typical examples of alkaline proteases include Maxatase and Maxacal from International BioSynthetics, Alcalase, Savinase and Esperase, all available from Novo Industri A/S. See also Stanislowski et al., U.S. Pat. No. 4,511,490, incorporated herein by reference.

Further suitable enzymes are amylases, which are carbohydrate-hydrolyzing enzymes. It is also preferred to include mixtures of amylases and proteases. Suitable amylases include Rapidase, from Société Rapidase, Milezyme from Miles Laboratory, and Maxamyl from International BioSynthetics.

Still other suitable enzymes are cellulases, such as those described in Tai, U.S. Pat. No. 4,479,881, Murata et al., U.S. Pat. No. 4,443,355, Barbesgaard et al., U.S. Pat. No. 4,435,307, and Ohya et al., U.S. Pat. No. 3,983,082, incorporated herein by reference.

Yet other suitable enzymes are lipases, such as those described in Silver, U.S. Pat. No. 3,950,277, and Thom et al., U.S. Pat. No. 4,707,291, incorporated herein by reference.

The hydrolytic enzyme should be present in an amount of about 0.01-5%, more preferably about 0.01-3%, and most preferably about 0.1-2% by weight of the detergent. Mixtures of any of the foregoing hydrolases are desirable, especially protease/amylase blends.

Additionally, optional adjuncts include dyes, such as Monastral blue and anthraquinone dyes (such as those described in Zielske, U.S. Pat. No. 4,661,293, and U.S. Pat. No. 4,746,461).

Pigments, which are also suitable colorants, can be selected, without limitation, from titanium dioxide, ultramarine blue (see also, Chang et al., U.S. Pat. No. 4,708,816), and colored aluminosilicates.

Fluorescent whitening agents are still other desirable adjuncts. These include the stilbene, styrene, and naphthalene derivatives, which upon being impinged by ultraviolet light, emit or fluoresce light in the visible wavelength. These FWA's or brighteners are useful for improving the appearance of fabrics which have become dingy through repeated soilings and washings. Preferred FWA's are Tinopal 5BMX-C and Tinopal RBS, both from Ciba Geigy A.G., and Phorwite RKH, from Mobay Chemicals. Examples of suitable FWA's can be found in U.S. Pat. Nos. 1,298,577, 2,076,011, 2,026,054, 2,026,566, 1,393,042; and U.S. Pat. Nos. 3,951,960, 4,298,290, 3,993,659, 3,980,713, and 3,627,758, incorporated herein by reference.

Anti-redeposition agents, such as carboxymethylcellulose, are potentially desirable. Next, foam boosters, such as appropriate anionic surfactants, may be appropriate for inclusion herein. Also, in the case of excess foaming resulting from the use of certain surfactants, anti-foaming agents, such as alkylated polysiloxanes, e.g., dimethylpolysiloxane, would be desirable. Fragrances are also desirable adjuncts in these compositions, although the activators herein have much lower odor than the fatty acid esters such as those in Chung et al., U.S. Pat. No. 4,412,934.

The additives may be present in amounts ranging from 0-50%, more preferably 0-30%, and most preferably 0-10%. In certain cases, some of the individual adjuncts may overlap in other categories. However, the present invention contemplates each of the adjuncts as providing discrete performance benefits in their various categories. The EXPERIMENTAL section below demonstrates the advantages of the inventive bleach activators and the detergents containing them.

TABLE IV

Bleach Activator Granules

| Wt. % | Component |
|---|---|
| 90 | Precursor |
| 2.5 | Binder, $C_{16-18}$ ethoxylated alcohol (Alfonic 1618-80 from Vista Chemical Co.). |
| 2.5 | Binder, $C_{12}$ sodium alkyl aryl sulfonate (Calsoft L40 from Pilot Chemical Co.), on an actives basis. |
| 5 | Diluent, can be any inert salt such as $Na_2SO_4$, $Na_2CO_3$, NaCl, etc. |

TABLE V

Detergent Formulation

| COMPONENT | Wt % |
|---|---|
| Na Tripolyphosphate | 33.21 |
| HLAS | 11.29 |
| Na Perborate Monohydrate | 7.46 |
| $Na_2CO_3$ | 40.40 |
| Silicate | 4.98 |
| Moisture | 2.66 |
| | 100.00 |

TABLE VI

Detergent + Activator Formulation

| Component | Wt. % |
|---|---|
| Na Tripolyphosphate | 27.16 |
| HLAS | 9.23 |
| Na Perborate Monohydrate | 6.10 |
| $Na_2CO_3$ | 33.04 |
| Silicate | 4.07 |
| Activator Granules | 8.94 |
| $Na_2SO_4$ | 6.74 |
| Alcosperse[1] | 0.32 |
| Ultramarine Blue[2] | 0.15 |
| FWA[3] | 0.32 |
| Dequest 2006[4] | 0.50 |
| Savinase[5] | 0.91 |
| Fragrance | 0.20 |
| Moisture | 2.32 |
| | 100.00 |

[1]Polyacrylic Acid Binder, Alco Company.
[2]Colorant.
[3]Fluorescent whitening agent.
[4]Chelating agent, Monsanto Company.
[5]Protease enzyme, Novo Industri A/S.

Solubility and Crush Durability

The results in TABLE VII show the solubility index and crush durability for several noodle compositions. The solubility index is defined as the time in minutes required for a 0.2 g sample to completely dissolved in 500 ml water at about 21° C. under constant stirring to yield a 2cm vortex in 1 liter beaker. The crush durability factor is the weight in grams required to crush a 2mm (length) granule between glass plates.

TABLE VII

Granules and Their Solubility Index and Crush Durability

| Binder | % Activator | % Binder | % Diluent | Solubility (Mins.) | Crush Factor (in grams) |
|---|---|---|---|---|---|
| Alfonic[1] | 90[2] | 10 | 0 | 5.23 | 40 |

TABLE VII-continued

| Granules and Their Solubility Index and Crush Durability | | | | | |
|---|---|---|---|---|---|
| Binder | % Activator | % Binder | % Diluent | Solubility (Mins.) | Crush Factor (in grams) |
| 1618-80 | 85[2] | 15 | 0 | 3.88 | 63 |
| | 80[2] | 20 | 0 | 3.75 | 81 |
| | 80[2] | 15 | 5 | 3.4 | 55 |
| Calsoft | 100[2] | 0 | 0 | 10.0 | 40 |
| F90[3] | 90[2] | 10 | 0 | 2.1 | 40 |
| | 85[2] | 15 | 0 | 1.5 | 40 |
| | 80[2] | 20 | 0 | 2.0 | 40 |
| Calsoft | 95 | 3 | 2 | 1.0 | 66 |
| L40[4] | 90 | 5 | 5 | 1.0 | 71 |
| 50/50 Blend | 90 | 5 | 5 | 1.0 | 108 |
| Alfonic[1] | 85 | 10 | 5 | 1.05 | 70 |
| 1618-80/ Calsoft L40[4] | 95 | 5 | 0 | 1.0 | 126 |

[1]Nonionic surfactant, Vista Chemical Company.
[2]Activator is sodium octanoyloxyacetate, phenol sulfonate ester.
[3]Anionic surfactant, Pilot Chemical Company, 90% active.
[4]Anionic surfactant, Pilot Chemical Company, 40% active.

Perhydrolysis and Storage Stability

The following granular dry bleaching compositions we re

| Component | Wt. in Grams |
|---|---|
| Na Perborate Monohydrate | 0.175 g (28 ppm A.O.) |
| $Na_2CO_3$ | 1.200 g |
| Activator (via granule or powder) | gram amount equivalent to 14 ppm A.O. theoretical |

The perhydrolysis profiles of the above bleach compositions (see TABLE IX, below) were carried out in the presence of Tide (Procter & Gamble Company) detergent. The composition (approximate) of this detergent is shown below in TABLE VIII.

TABLE VIII

| Composition of Tide Detergent | |
|---|---|
| Component | Wt. % |
| $Na_2CO_3$ | 14.7 |
| Na Tripolyphosphate | 37.9 |
| $[Na_2O]SiO_2$ | 4.0 |
| Na LAS | 4.0 |
| Na AEOS | 13.0 |
| Tinopal AMS (brightener) | 0.21 |
| Water (moisture) | 5.5 |
| $Na_2SO_4$ | 20.8 |
| | 100.00% |

Although this particular detergent base is used, other anionic or nonionic based detergents could be utilized as well.

The active oxygen profiles were obtained in the following manner: The bleaching compositions were placed in 1,000 mL water at 21.7°0 C., at 100 ppm hardness (3/1 $Ca^{+2}/Mg^{+2}$), 15 mMol. $NaHCO_3$, with the detergent content at 1.287 g/L. The solution pH was adjusted to 10.5. The water was stirred at a rate so as to yield a 3cm vortex, in a standard 2 liter beaker, and the amount of active oxygen (A.O.) from peracid generated was determined iodometrically.

The results are shown in TABLE IX below, which demonstrates the benefit of using a granulated activator over the powdered activator, which was cliamed in U.S. Pat. No. 4,778,618. The granulated activator dispersed more rapidly than the powdered activator, thus yielding a higher active oxygen level over a longer period of time.

TABLE IX

| Perhydrolysis Profile of Granulated versus Powdered Activator | | | |
|---|---|---|---|
| | % A.O. of theoretical @ various times (minutes) | | |
| Example | t = 2 | t = 6 | t = 12 |
| Granule[1] | 93 | 84 | 81 |
| Powder[2] | 45 | 71 | 82 |

[1]Granule was octanoyloxyacetate, phenol sulfonate ester, 90%, with linear $C_{11.5}$ alkylbenzene sulfonate, sodium salt, 10%.
[2]Powder was 100% octanoyloxyacetate, phenol sulfonate ester.

Storage stability of dry bleach compositions containing the activator were determined under the following conditons: The compostiions were placed in open glass vials and stored in a storage room which maintained a constant temperature of about 32° C. and a relative humidity of about 85%. After stroage, the samples were measured for their activator content by determining the yield of peracid A.O. in solution at six and twelve minutes.

The percent activator of various samples after storage are shown in TABLE X.

TABLE X

| Storage Stability in Open Glass Vials 32° C., 85% relative humidity | | | | |
|---|---|---|---|---|
| | % of original A.O. remaining Time in days | | | |
| Sample | t = 0 | t = 2 | t = 7 | t = 10 |
| Activator[1]/ LAS[2], 90/10 | 100 | 100 | 79 | 66 |
| Activator (Powder) | 100 | 76 | 9 | 5 |

[1]Octanoyloxyacetate, phenol sulfonate ester.
[2]linear $C_{11.5}$ alkyl benzene sulfonate.

The results in TABLE X show that granulated activator is significantly more storage stable than the powdered activator. After ten days storage, the granules exhibit a 44% A.O. loss, while the powder experiences about 95% A.O. loss.

In the test below, storage stability of the noodled/-granulated activator was compared against the powdered activator. The conditions were: 32° C., 70% relative humidity stored in an anionic (phosphate) base (see, e.g., the formulation of TABLE VI, above). The granules contained 90% nonanoyloxyacetate, phenol sulfonate ester; 5% $Na_2SO_4$, and 5% binder (LAS and Carbowax 8000, Carbowax 4600, Alfonic 1416-80, each at 50/50 wt./wt.).

TABLE XI

| | % A.O. yield of theoretical | | |
|---|---|---|---|
| Binder | t = 0 | t = 1 week | t = 2 weeks |
| Carbowax 8000/LAS[1] | 88% | 83% | 73% |
| Carbowax 4600/LAS[1] | 88% | 83% | 73% |
| Alfonic 1416-80/LAS[1] | 83% | 80% | 73% |
| Powdered Activator | 63% | 25% | 0% |

[1]LAS = Calsoft L40, Pilot Chemical Co.

Further tests were conducted comparing the granulated/noodled activator against the powdered activator, but this time, as a detergent composition. In this case, the activator evaluated was nonanoyloxyacetate, phenol sulfonate ester. The data were obtained in the presence of the detergent formulation of TABLE V above. 1.4 g of the detergent was added to 1,000 ml of water at 21° C. in a 2 liter beaker and stirred at a rate so as to yield a 3 cm vortex. The results are reported below, in TABLE XII.

TABLE XII

Perhydrolysis Profile of Noodled Activator versus Powdered Activator

| Sample | % A.O. of theoretical at various times (t) in days t = 4 | t = 8 | t = 12 |
|---|---|---|---|
| Activator[1] | 88 | 88 | 78 |
| Activator[2] (Powder) | 62 | 66 | 56 |

[1]Nonanoyloxyacetate, phenol sulfonate ester, 90% (as produced), granulated with Calsoft L40, 2.5%, PEG 4600, 2.5%, sodium sulfate (filler), 5%.
[2]Nonanoyloxyacetate, phenol sulfonate ester, 100% (as produced).

Further experiments conducted tested the performance of particular surfactants in the detergent base with which the activator granules were combined. Surprisingly, Applicants discovered that performances of certain long chain linear alkyl benzene sulfonates demonstrably improved cleaning performance.

TABLE XIII

| Chain length Distributions: | $C_{10}$ | $C_{11}$ | $C_{12}$ | $C_{13}$ | $C_{14}$ | Mol. Wt. |
|---|---|---|---|---|---|---|
| 1. Biosoft S130 | — | — | 17% | 50% | 28% | 340 |
| 2. Biosoft S100 | 20% | 43% | 32% | 4% | 1% | 316 |

A nonphosphate detergent having the formulation as in TABLE XIV below used surfactants 1 and 2 shown in TABLE XIII in the detergent base. These two examples were tested in wash water at about 21° C., 100 ppm hardness and the results reported in TABLE XV.

TABLE XIV

Nonphosphate Detergent + Activator Formulation

| Component | Wt. % |
|---|---|
| $Na_2CO_3$ | 61.13 |
| HLAS | 11.34 |
| Na Perborate Monohydrate | 7.49 |
| Silicate | 6.48 |
| Activator Noodle | 9.97 |
| Minors, including $Na_2SO_4$, UMB, Enzyme, Moisture, etc. | 3.59 |
| | 100.00 |

The following performance data were thereby obtained:

TABLE XV

Performance Comparison Soil/Fabric % Soil Removal (E)

| Surfactant | Sebum on Cotton | Sebum on Polyester | Sebum on Polycotton |
|---|---|---|---|
| Biosoft S130 | 71.9 | 92.6 | 81.6 |
| Biosoft S100 | 62.2 | 73.8 | 69.1 |
| LSD(t-test) (95% confidence) | 7.6 | 3.9 | 9.8 |
| Average Scores For % S.R. on all Fabrics | | | |
| Biosoft S130 | 82.0 | | |
| Biosoft S100 | 68.4 | | |
| $LSD_{(t\text{-}test)}$ (95% confidence) | 4.4 | | |

The above data demonstrate that selection of surfactant can have a significant effect on performance in detergent compositions containing the inventive activator granules. Thus, it has been shown that longer chain anionic surfactants are especially desirable for implementation in Applicants' detergent systems.

In another test, the effect on performance is reviewed when sodium perborate tetrahydrate is used as the oxidant, the surfactant chain length is varied, and the builder system is non-phosphate. The formulation in TABLE XIV, above, was used, with conditions of: perborate tetrahydrate crystals with particle size of U.S. mesh grade 30; 21° C., 100 ppm water hardness; and nonphosphate builder system (pH 10–10.5).

The results are shown in TABLE XVI.

TABLE XVI

% A.O. of peroxide yield at 12 minutes

| Surfactant | Perborate × $4H_2O$[1] | Perborate × $1H_2O$[2] |
|---|---|---|
| Biosoft S130 | 31% | 95% |
| Biosoft S100 | 91% | 95% |
| Neodol 25-9 | 95% | 95% |

[1]Sodium perborate tetrahydrate.
[2]Sodium perborate monohydrate.

The above results demonstrate that in a non-phosphate system, the chain length of the surfactant can influence solubility of the perborate tetrahydrate, when the surfactant is anionic. Further, the effect is not influenced by pH in the 9.8–11.0 range, water hardness (0–200 ppm), and temperature below 32° C.

Because of this effect, it is preferred to use perborate monohydrate in a non-phosphate system which, as shown in TABLE XVI, is soluble.

In yet another test below, the solubility difference between the phosphate detergent formulation containing sodium perborate monohydrate in TABLE VI and an identical formulation containing sodium perborate tetrahydrate were compared. The amount of particulate residue collected on a black swatch after filtering the wash solution therethrough indicates the degree of solubility of the respective formulations.

The procedure for determining detergent residue (meant to simulate a scaled-down wash load) is as follows: 10 g detergent is added to a 2 liter beaker containing 1000 ml water at about 21° C. and stirred at a rate so as to yield a vortex of about 2–3 cm. After a time of twelve minutes , the solution is filtered onto a black cloth (which has been previously weighed). The cloth and the undissolved particles are collected and dried. The dried cloth is then re-weighed to determine the amount of undissolved particles.

TABLE XVII

Detergent Solubility

| Example | Residue (grams) |
|---|---|
| A[1] | 0.011 |
| B[2] | 0.293 |

[1]Detergent formula described in TABLE VI, above.
[2]Detergent formula listed in TABLE VI, with sodium perborate tetrahydrate substituted for sodium perborate monohydrate.

The above test results reported in TABLE XVII demonstrate that when the surfactant used is $C_{12-14}$ HLAS, in a non-phosphate system, it is preferred to use perborate monohydrate as the peroxide source in order to reduce residual undissolved particles.

The next experiments show the effect of heavy metal ions on solution stability of the in situ formed peracid from the inventive activator granules. Surprisingly, the use of an aminopolyphosphonate chelating agent reduced loss of peracid formed in solution when heavy metal cations were present. Tri(methylene phosphonic acid) amine (Dequest 2000 manufactured by Monsanto) was used as the chelating agent. Its effect on peracid decomposition in the presence of Cu++ ion was measured by dissolving 4.5 g of the detergent composition shown in TABLE VI into three liters of water containing 100 ppm hardness (3:1 $Ca^{+2}$:$Mg^{+2}$) and the concentration of copper shown in Table XVIII. The composition contained nonanoyloxyacetate phenol sulfonate ester as a powder.

TABLE XVIII

| | Average ppm[1] of A.O. 4, 8, and 12 minutes | | |
|---|---|---|---|
| Example | Avg. ppm[1], A.O. | ppb[2] Cu++ | ppm[1] Dequest 2000 |
| 1 | 2.7 | 0 | 0 |
| 2 | 2.0 | 50 | 0 |
| 3 | 1.3 | 100 | 0 |
| 4 | 0.9 | 250 | 0 |
| 5 | 2.6 | 250 | 10 |

[1]ppm = parts per million.
[2]ppb = parts per billion.

Table XVIII clearly demonstrates that heavy metal cations, e.g., copper ion, decompose the peracid formed from the activator and that a chelating agent (Dequest 2000) prevents this copper ion catalyzed decomposition.

A crystalline form of nonanoyloxyglycoylphenylsulfonate precursor ("NOGPS"), produced by a modified method described in U.S. Pat. No. 4,778,618, was made into noodles as described in 3. Forming the Granules, above and the formulation is shown in TABLE XIX. In the tests conducted with such granules, various solubility additives were included to evaluate solubility enhancement. The noodle composition was similar to TABLE IV, above, but varied, as follows:

TABLE XIX

| | Bleach Activator Granules | |
|---|---|---|
| Gram Wt. | Wt. % | Component |
| 4.2 | 85.0 | Precursor, NOGPS (80% active) |
| 0.12 | 2.5 | Binder, polyethylene glycol, Carbowax 4600, from Union Carbide) |
| 0.12 | 2.5 | Binder, $C_{12}$ sodium alkyl aryl sulfonate (Calsoft L40 from Pilot Chemical Co.), on an actives basis. |
| 0.49 | 10.0 | Solubility Additive |
| 4.93 | 100.0 | |

For the solubility test, various additives were added to see whether solubility was improved thereby. These granule compositions were then tested for solubility in a manner similar to that described for the detergent solubility test in TABLE XVII, above. In this procedure, unlike there, Kevex filter paper was used instead of black cloth, and the residue is measured in percent remaining residue.

As shown in TABLE XX below, sodium xylene sulfonate, magnesium sulfate and polyvinyl pyrrolidone performed especially well. In fact, the magnesium sulfate alone worked better than a mixture of magnesium sulfate and sodium sulfate.

TABLE XX

| Additive | % Residue |
|---|---|
| NaCl | 49% |
| STPP[1] | 30% |
| Borax | 28% |
| $Na_2SO_4$[2] | 25% |
| $Na_2SO_4$[2]/ $MgSO_4$ | 19% |
| Dequest 2006[4] | 11% |
| SXS[5] | 5% |
| $MgSO_4$[3] | 0 |
| PVP[6] | 0 |
| PVP[7] | 0 |

[1]Sodium tripolyphosphate
[2]Sodium sulfate
[3]Magnesium sulfate
[4]Aminopolyphosphonate from Union Carbide
[5]Sodium xylene sulfonate
[6]Polyvinylpyrrolidone, K-30, from GAF Corporation
[7]Polyvinylpyrrolidone, Polyclar, from GAF Corporation Following the procedure of Example 3E of the copending application of Ottoboni et al., nonanoyloxyglycoylphenylsulfonic acid ("NOGPSA") was produced by using two sequentially added quenching agents, toluene and linear alkyl benzene ("LAB"). The resulting sulfonic acid ester was then neutralized in accordance with Example 8B of the same application. To this neutralized, nonanoyloxyglycoylphenylsulfonate precursor ("NOGPS") was added calcium silicate, polyethylene glycol binder and magnesium sulfate. The resulting composition of the granule is shown in TABLE XXI, below:

TABLE XXI

| Ingredient | Wt. % |
|---|---|
| NOGPS + minor products | 44 |
| Sodium toluene sulfonate | 15 |
| NaNOA[1] | 11 |
| LAS[2] | 9 |
| Micro Cel C[3] | 6 |
| PEG 4600[4] | 2 |
| $MgSO_4$[5] | 2 |
| Misc. | remainder |

[1]Sodium nonanoyloxyacetate.
[2]linear alkyl benzene sulfonate, formed as a reaction product from LAB used as a quenching agent. LAB is from Vista Chemicals.
[3]Calcium silicate from Celite Corporation.
[4]Carbowax 4600, a polyethylene glycol from Union Carbide.
[5]Magnesium sulfate.

The Crush Durability test shown in TABLE VII and accompanying text, above, was repeated for the granule composition shown in TABLE XXI. As a control, a granule which contained neither polyethylene glycol nor calcium silicate, was compared.

The formulation of TABLE XXI was found to achieve a crush factor of 369 grams. The control, on the other hand, had <20 grams crush factor.

Following the procedure of Example 1 of the copending application of Ottoboni et al., NOGPSA was produced by using linear alkyl benzene as the sole quenching agent. The resulting sulfonic acid ester was then neutralized in accordance with Example 8B of the same application. To this NOGPS was added calcium silicate, polyethylene glycol binder and magnesium sulfate solubilizing aid. The resulting composition of the granule is shown in TABLE XXII, below:

TABLE XXII

| Ingredient | Wt. % |
|---|---|
| NOGPS + minor products | 40 |
| LAS[1] | 22 |
| Micro Cel C[2] | 9 |
| NaNOA[3] | 9 |
| $MgSO_4$[4] | 4 |
| PEG 4600[5] | 3 |

TABLE XXII-continued

| Ingredient | Wt. % |
|---|---|
| Misc. | remainder |

[1]linear alkyl benzene sulfonate, formed as a reaction product from LAB used as a quenching agent. LAB is from Vista Chemicals.
[2]Calcium silicate from Celite Corporation.
[3]Sodium nonanoyloxyacetate.
[4]Magnesium sulfate.
[5]Carbowax 4600, a polyethylene glycol from Union Carbide.

Again, the Crush Durability test shown in TABLE VII and accompanying text, above, was repeated for the granule composition shown in TABLE XXII. As a control, a granule which contained neither polyethylene glycol nor calcium silicate, was compared.

The formulation of TABLE XXII was found to achieve a crush factor of 350 grams. The control, on the other hand, had <20 grams crush factor.

The resulting NOGPS granules from TABLES XXI and XXII can then be placed into a detergent formulation, as previously described, or peroxygen bleach formulation. In TABLE XXIII, a peroxygen bleach composition into which these granules can be incorporated is described:

TABLE XXIII

| Ingredient | Wt. % |
|---|---|
| Sodium carbonate[1] | 60.0-70.0 |
| Sodium polyacrylate[1,2] | 2.0-6.0 |
| Sodium silicate[1,3] | 2.0-6.0 |
| Sodium Perborate monohydrate | 6.4 |
| NOGPS Granules (40% active) | 17.0 |
| Aminopolyphosphonate[4] | 0.6 |
| Enzyme[5] | 1.5 |
| FWA[6] | 0.38 |
| Pigment[7] | 0.18 |
| Fragrance | 0.24 |
| Totals: | varies |

[1]levels of first three ingredients may vary depending on process used.
[2]Builder/buffer, e.g., Acusol 445, Rohm & Haas.
[3]Builder, e.g., Silicate RU, PQ Corp.
[4]Chelant, e.g., Dequest 2006, Union Carbide.
[5]Protease, e.g., Savinase, Novo A/S.
[6]Fluorescent whitening agent/optical brightener, e.g., Phorwite RKH, Mobay Chemicals.
[7]E.g., ultramarine blue.

The invention is further exemplified in the claims which follow. However, the invention is not limited thereby, and obvious embodiments and equivalents thereof are within the claimed invention.

We claim:

1. Stable bleach activator granules comprising:

a) a peroxygen bleach activator having the structure:

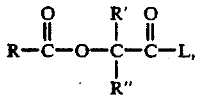

wherein R is $C_{1-20}$ branched or straight chain alkyl, alkoxylated alkyl, cycloalkyl, alkenyl, aryl, substituted alkyl, alkylaryl; R' and R" are independently H, $C_{1-4}$ alkyl, aryl; and L is a leaving group selected from the group consisting of:

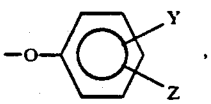
(i)

wherein Y and Z are individually H, $SO_3M$, $CO_2M$, $SO_4M$, OH, halo substituent, $OR^1$, $R^2$, $NR^3{}_3X$, and mixtures thereof, wherein M is an alkali metal or alkaline earth metal counterion, $R^1$ of $OR^1$ is $C_{1-20}$ alkyl, $R^2$ is $C_{1-6}$ alkyl, $R^3$ of $NR_3{}^3$ is $C_{1-30}$ alkyl and X is a counterpart ion thereto, and Y and Z can be the same or different;

(ii) halide;

(iii) $-ONR^4$, wherein $R^4$ contains at least one carbon which is singly or doubly bonded directly to N;

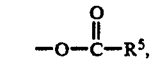
(iv)

b) a pliable binding material selected from materials having a melting completion temperature of greater than about 40° C.; and c) as a solubilizing aid, either magnesium sulfate, polyvinyl pyrrolidone, alkali aryl sulfonate, or a combination thereof.

2. The bleach activator granules of claim 1 wherein the activator of a) has an leaving group, L, the conjugate acid whereof has a $pK_a$ of about 4 to 20.

3. The bleach activator granules of claim 1 wherein the pliable binding material of b) is selected from the group consisting of anionic surfactants, nonionic surfactants, water soluble organic polymers, water dispersible organic polymers, and mixtures thereof.

4. The bleach activator granules of claim 1 further comprising d) filler material which is an inorganic or organic filler.

5. The bleach activator granules of claim 1 wherein said solubilizing aid is magnesium sulfate.

6. The bleach activator granules of claim 1 wherein said solubilizing aid is polyvinyl pyrrolidone.

7. The bleach activator granules of claim 1 wherein said solubilizing aid is alkali aryl sulfonate.

8. The bleach activator granules of claim 7 wherein said alkali aryl sulfonate is toluene sulfonate.

9. The bleach activator granules of claim 7 wherein said alkali aryl sulfonate is xylene sulfonate.

10. The bleach activator granules of claim 1 wherein the activator has the structure

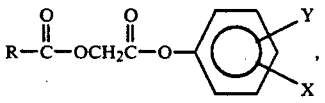

and Y and Z are separately selected from H, $SO_3M$, $CO_2M$, $SO_4M$, OH, halo substituent, $OR^1$, $R^2$, $NR_3{}^3X$, and mixtures thereof, wherein M is an alkali metal or alkaline earth metal counterion, $R^1$ of $OR^1$ is $C_{1-20}$ alkyl, $R^2$ is $C_{1-6}$ alkyl, $R^3$ of $NR_3{}^3$ is $C_{1-20}$ alkyl, and X is a counterpart ion thereto, and Y and Z can be the same or different.

11. The bleach activator granules of claim 10 wherein the activator has the structure:

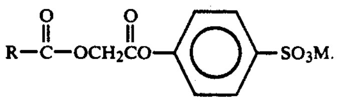

12. The bleach activator granules of claim 11 wherein the activator has the structure

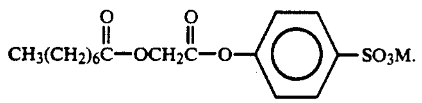

13. The bleach activator granules of claim 11 wherein the activator has the structure

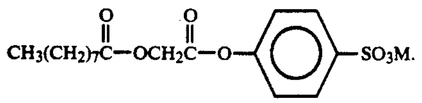

14. The bleach activator granules of claim 11 wherein the activator has the structure

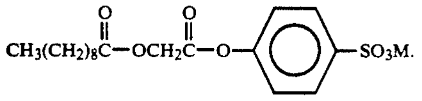

15. The bleach activator granules of claim 1 further comprising a bleach-effective amount of a source of hydrogen peroxide

16. The bleach activator granules of claim 15 wherein said source of hydrogen peroxide is selected from the group consisting of alkali metal perborates, alkali metal percarbonates, hydrogen peroxide adducts and mixtures thereof.

17. The bleach activator granules of claim 15, further comprising g) a detergent base which comprises:

i) builders;

ii) fillers; and iii) a surfactant selected from the group consisting of anionic, nonionic, cationic, amphoteric, zwitterionic surfactants, and mixtures thereof.

18. The bleach activator granules of claim 15 or 17 further comprising i) a cleaning adjunct selected from the group consisting of enzymes, dyes, pigments, fluorescent whitening agents, anti-redeposition agents, chelating agents, anti-foaming agents, buffers, fragrances, and mixtures thereof.

19. Stable bleach activator granules comprising:

a) a peroxygen bleach activator having the structure:

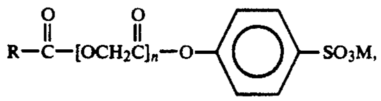

wherein R is a $C_{1-20}$ straight or branched chain alkyl, alkenyl, aryl, alkylaryl or substituted aryl, n is an integer from 1-10, and M is H, an alkali metal, alkaline earth, or ammonium counterion;

b) a binding material formed in situ when an intermediate

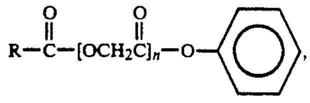

to the activator is sulfonated and neutralized;

c) a stiffener selected to increase the durability of the granules.

20. The bleach activator granules of claim 19 wherein the activator has the structure

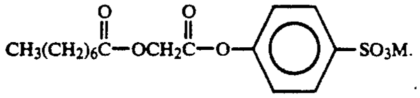

21. The bleach activator granules of claim 19 wherein the activator has the structure

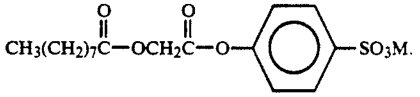

22. The bleach activator granules of claim 19 wherein the activator has the structure

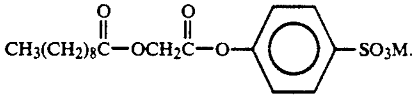

23. The bleach activator granules of claim 22, further comprising a detergent base which comprises:

i) builders;

ii) fillers; and iii) a surfactant selected from the group consisting of anionic, nonionic, cationic, amphoteric, zwitterionic surfactants, and mixtures thereof.

24. The bleach activator granules of claim 19 further comprising a bleach-effective amount of a source of hydrogen peroxide

25. The bleach activator granules of claim 24 wherein said source of hydrogen peroxide is selected from the group consisting of alkali metal perborates, alkali metal percarbonates, hydrogen peroxide adducts and mixtures thereof.

26. The bleach activator granules of claim 24 or 23 further comprising a cleaning adjunct selected from the group consisting of enzymes, dyes, pigments, fluorescent whitening agents, anti-redeposition agents, chelating agents, anti-foaming agents, buffers, fragrances, and mixtures thereof.

27. The bleach activator granules of claim 19 wherein said stiffener is selected from the group consisting of magnesium silicate, calcium silicate, silica, and mixtures thereof.

28. The bleach activator granules of claim 27 wherein said stiffener is calcium silicate.

* * * * *